US012625353B2

(12) United States Patent　　　　　(10) Patent No.:　US 12,625,353 B2

Shinzato et al.　　　　　　　　　　　(45) Date of Patent:　　May 12, 2026

(54) ZOOM LENS AND APPARATUS INCLUDING THE SAME

(71) Applicant: CANON KABUSHIKI KAISHA, Tokyo (JP)

(72) Inventors: Yuki Shinzato, Saitama (JP); Shunji Iwamoto, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 255 days.

(21) Appl. No.: 18/514,643

(22) Filed: Nov. 20, 2023

(65) Prior Publication Data

US 2024/0176214 A1　　May 30, 2024

(30) Foreign Application Priority Data

Nov. 25, 2022　(JP) ................................. 2022-187859

(51) Int. Cl.
　　*G02B 15/14*　　　(2006.01)
　　*G02B 3/00*　　　(2006.01)
(52) U.S. Cl.
　　CPC ...... *G02B 15/144511* (2019.08); *G02B 3/005* (2013.01)
(58) Field of Classification Search
　　CPC ........................ G02B 15/144511; G02B 3/005
　　USPC ....................................................... 359/680
　　See application file for complete search history.

(56) References Cited

U.S. PATENT DOCUMENTS

| | | | | |
|---|---|---|---|---|
| 2007/0002460 A1* | 1/2007 | Yamamoto | ..... | G02B 15/144113 |
| | | | | 359/687 |
| 2007/0229973 A1* | 10/2007 | Souma | ........... | G02B 15/144511 |
| | | | | 359/686 |
| 2011/0002044 A1* | 1/2011 | Inoko | ..................... | G02B 13/22 |
| | | | | 359/680 |
| 2015/0219884 A1* | 8/2015 | Inoue | ..................... | G02B 13/16 |
| | | | | 359/680 |
| 2021/0165196 A1* | 6/2021 | Gyoda | ........... | G02B 15/144511 |
| 2023/0131009 A1* | 4/2023 | Asami | ................... | G02B 13/14 |
| | | | | 359/687 |

FOREIGN PATENT DOCUMENTS

JP　　　　2007279147 A　　10/2007

* cited by examiner

*Primary Examiner* — Sharrief I Broome
(74) *Attorney, Agent, or Firm* — Canon U.S.A., Inc. IP Division

(57)　　　　　　ABSTRACT

A zoom lens includes a first lens unit having a negative refractive power, a second lens unit having a positive refractive power, and a rear lens group including one or more lens units, which are disposed in this order from an object side to an image side, wherein a distance between adjacent lens units changes in zooming, wherein the first lens unit does not move and the second lens unit moves in zooming, wherein the second lens unit includes subunits L2a and L2b having a positive refractive power, which are disposed in this order from the object side, wherein the subunit L2a moves to include a component in a direction perpendicular to an optical axis in image stabilization, wherein the rear lens group includes a focus lens unit that moves in focusing, and wherein the zoom lens satisfies predetermined inequalities.

26 Claims, 19 Drawing Sheets

FIG.2A
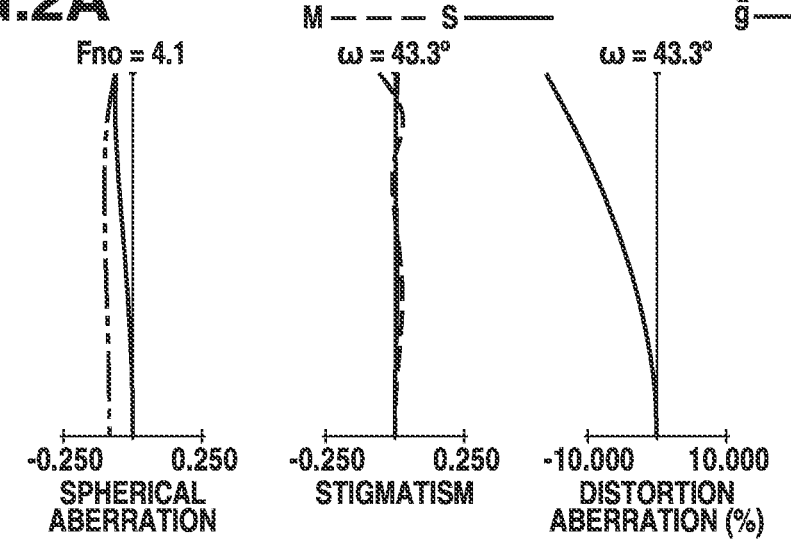
M — — — S ————
d ————
g — — —
Fno = 4.1     ω = 43.3°     ω = 43.3°     ω = 43.3°
-0.250     0.250
SPHERICAL
ABERRATION
-0.250     0.250
STIGMATISM
-10.000     10.000
DISTORTION
ABERRATION (%)
-0.030     0.030
CHROMATIC
ABERRATION
FIG.2B
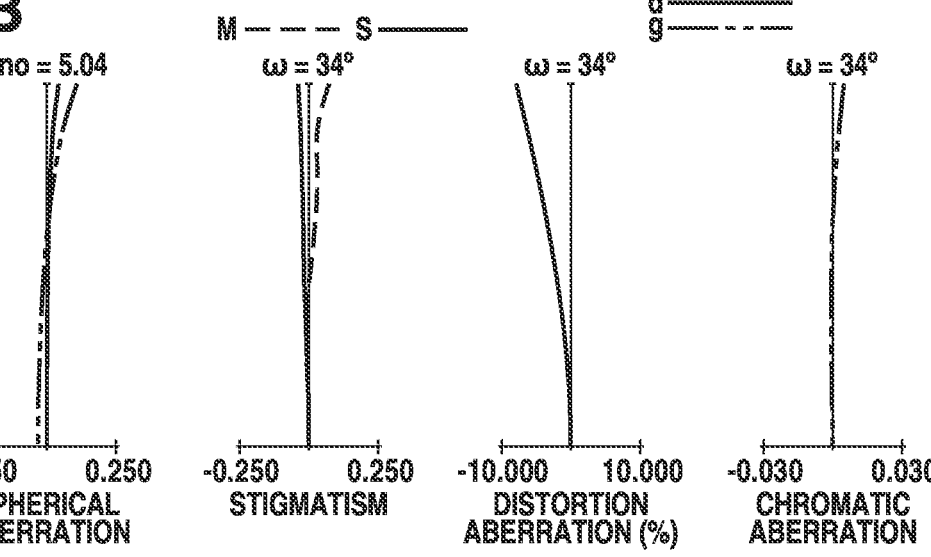
M — — — S ————
d ————
g — — —
Fno = 5.04     ω = 34°     ω = 34°     ω = 34°
-0.250     0.250
SPHERICAL
ABERRATION
-0.250     0.250
STIGMATISM
-10.000     10.000
DISTORTION
ABERRATION (%)
-0.030     0.030
CHROMATIC
ABERRATION
FIG.2C
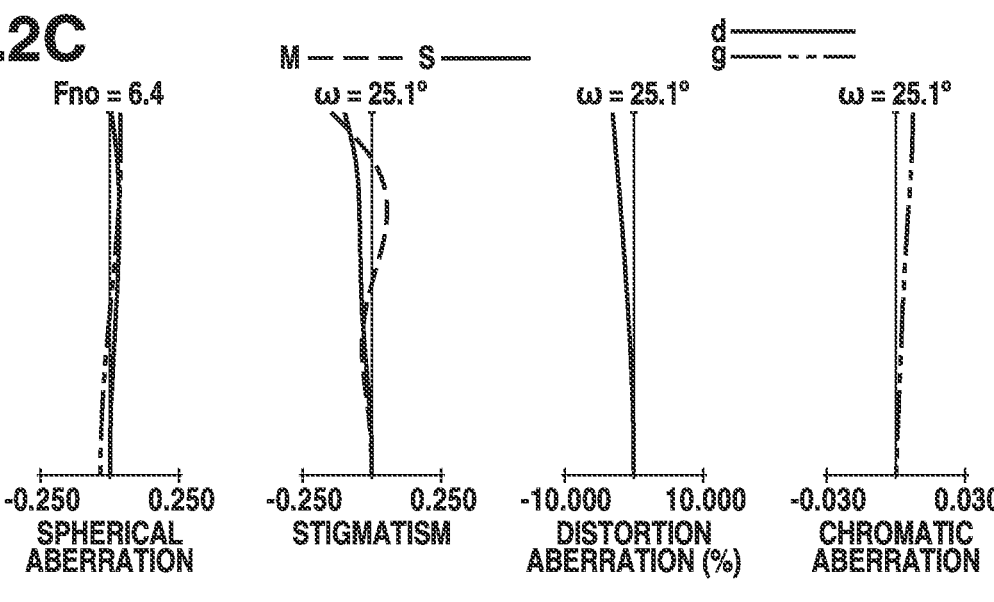
M — — — S ————
d ————
g — — —
Fno = 6.4     ω = 25.1°     ω = 25.1°     ω = 25.1°
-0.250     0.250
SPHERICAL
ABERRATION
-0.250     0.250
STIGMATISM
-10.000     10.000
DISTORTION
ABERRATION (%)
-0.030     0.030
CHROMATIC
ABERRATION

FIG.4A
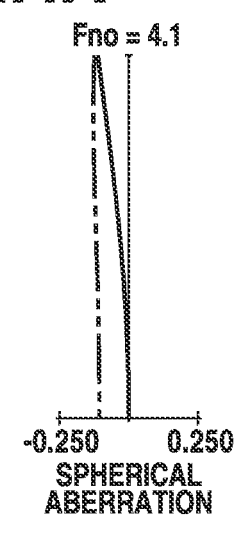
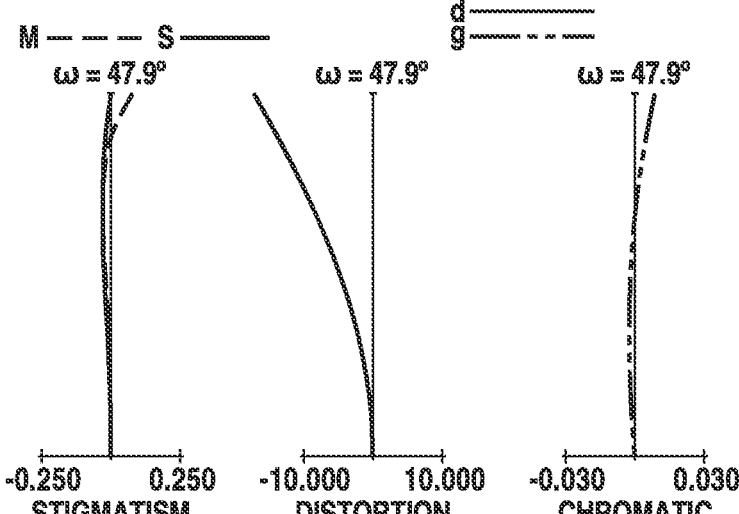
Fno = 4.1
M ― ― ― S ―――
ω = 47.9°
ω = 47.9°
d ―――
g ― ― ―
ω = 47.9°
-0.250  0.250
SPHERICAL
ABERRATION
-0.250  0.250
STIGMATISM
-10.000  10.000
DISTORTION
ABERRATION (%)
-0.030  0.030
CHROMATIC
ABERRATION
FIG.4B
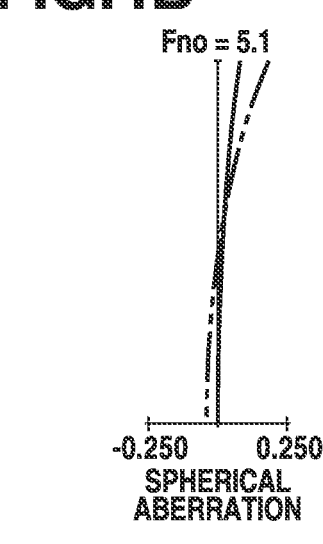
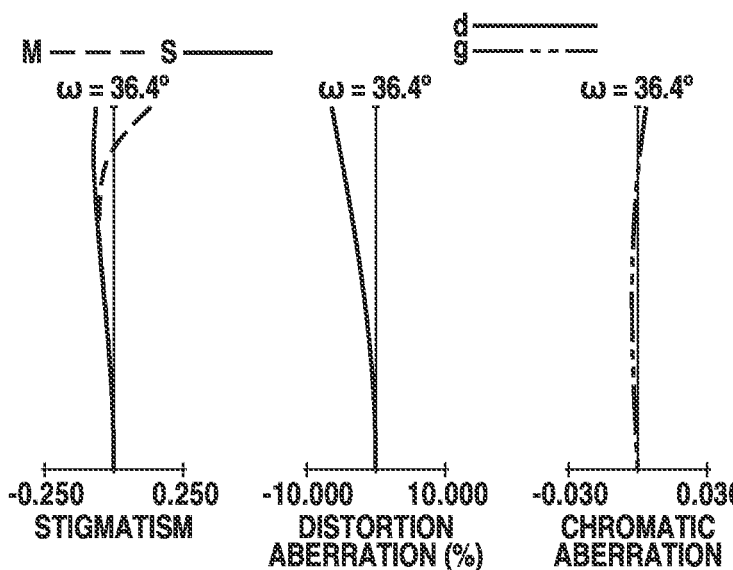
Fno = 5.1
M ― ― ― S ―――
ω = 36.4°
ω = 36.4°
d ―――
g ― ― ―
ω = 36.4°
-0.250  0.250
SPHERICAL
ABERRATION
-0.250  0.250
STIGMATISM
-10.000  10.000
DISTORTION
ABERRATION (%)
-0.030  0.030
CHROMATIC
ABERRATION
FIG.4C
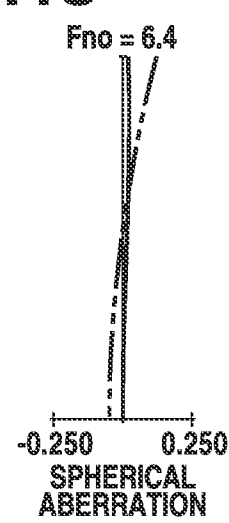
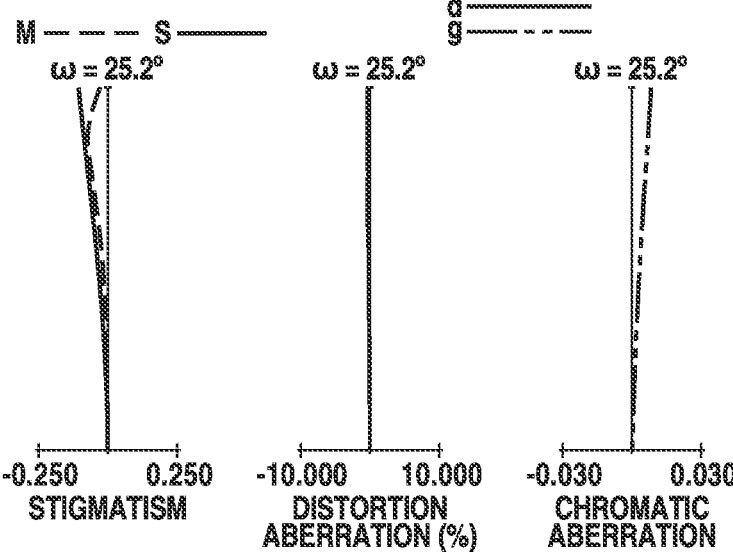
Fno = 6.4
M ― ― ― S ―――
ω = 25.2°
ω = 25.2°
d ―――
g ― ― ―
ω = 25.2°
-0.250  0.250
SPHERICAL
ABERRATION
-0.250  0.250
STIGMATISM
-10.000  10.000
DISTORTION
ABERRATION (%)
-0.030  0.030
CHROMATIC
ABERRATION Fno = 4.1

M ———— S ————     ω = 43.6°

ω = 43.6° d ————
g ————     ω = 43.6°

-0.250     0.250
SPHERICAL
ABERRATION

-0.250     0.250
STIGMATISM

-10.000     10.000
DISTORTION
ABERRATION (%)

-0.030     0.030
CHROMATIC
ABERRATION

Fno = 5.05

M ———— S ————     ω = 34.3°

ω = 34.3° d ————
g ————     ω = 34.3°

-0.250     0.250
SPHERICAL
ABERRATION

-0.250     0.250
STIGMATISM

-10.000     10.000
DISTORTION
ABERRATION (%)

-0.030     0.030
CHROMATIC
ABERRATION

Fno = 6.33

M ———— S ————     ω = 25.3°

ω = 25.3° d ————
g ————     ω = 25.3°

-0.250     0.250
SPHERICAL
ABERRATION

-0.250     0.250
STIGMATISM

-10.000     10.000
DISTORTION
ABERRATION (%)

-0.030     0.030
CHROMATIC
ABERRATION

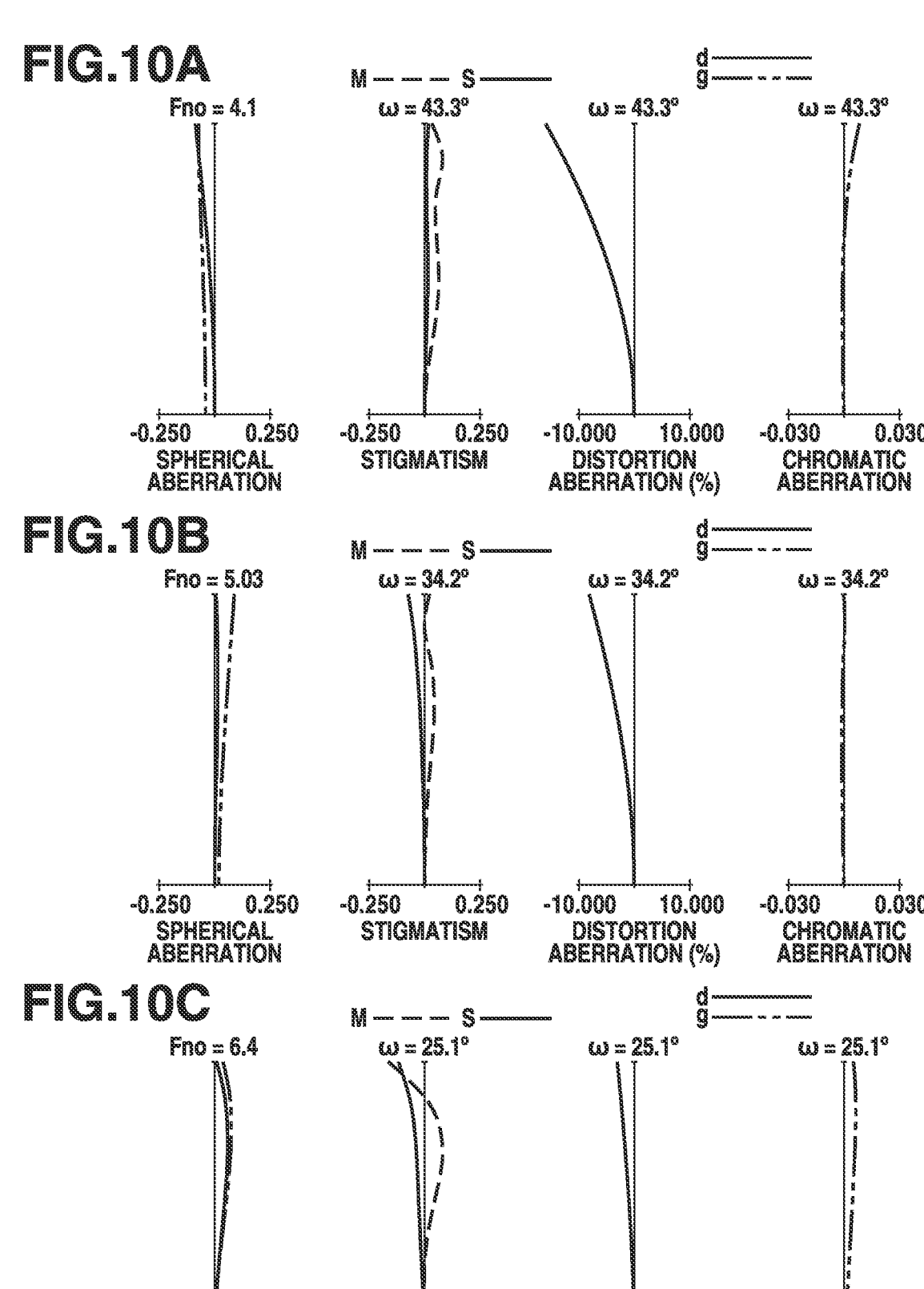

FIG.10A

Fno = 4.1

M ─ ─ ─ S ─────     d ─────
                    g ─ ── ─

ω = 43.3°     ω = 43.3°     ω = 43.3°

-0.250    0.250
SPHERICAL
ABERRATION

-0.250    0.250
STIGMATISM

-10.000    10.000
DISTORTION
ABERRATION (%)

-0.030    0.030
CHROMATIC
ABERRATION

FIG.10B

Fno = 5.03

M ─ ─ ─ S ─────     d ─────
                    g ─ ── ─

ω = 34.2°     ω = 34.2°     ω = 34.2°

-0.250    0.250
SPHERICAL
ABERRATION

-0.250    0.250
STIGMATISM

-10.000    10.000
DISTORTION
ABERRATION (%)

-0.030    0.030
CHROMATIC
ABERRATION

FIG.10C

Fno = 6.4

M ─ ─ ─ S ─────     d ─────
                    g ─ ── ─

ω = 25.1°     ω = 25.1°     ω = 25.1°

-0.250    0.250
SPHERICAL
ABERRATION

-0.250    0.250
STIGMATISM

-10.000    10.000
DISTORTION
ABERRATION (%)

-0.030    0.030
CHROMATIC
ABERRATION

FIG.12A
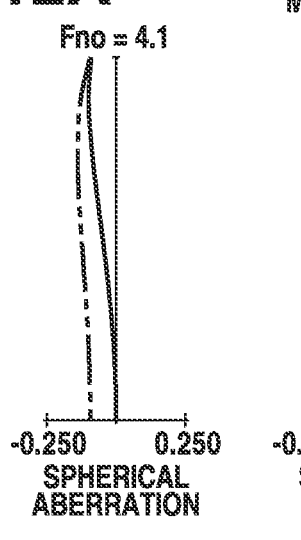
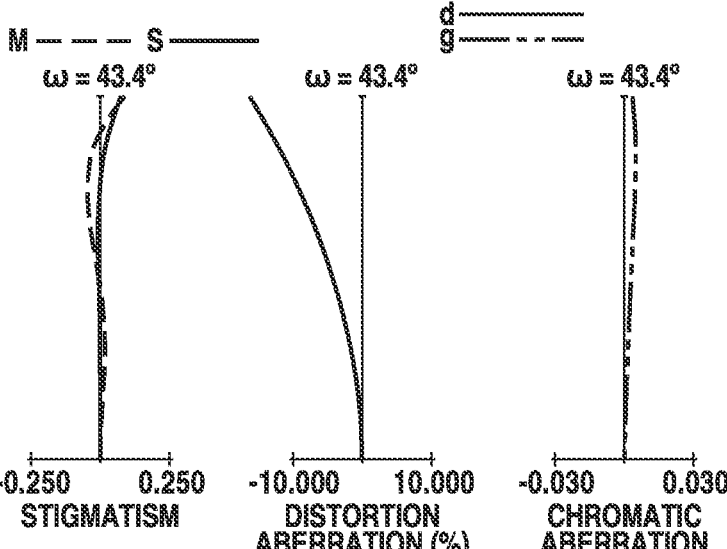
Fno = 4.1     M — — — S ———     ω = 43.4°     ω = 43.4°     d ——— g — — —
-0.250   0.250    -0.250   0.250    -10.000   10.000    -0.030   0.030
SPHERICAL ABERRATION    STIGMATISM    DISTORTION ABERRATION (%)    CHROMATIC ABERRATION
FIG.12B
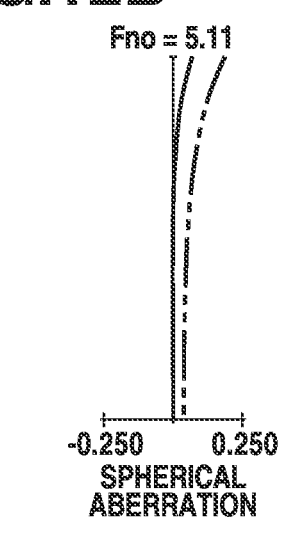
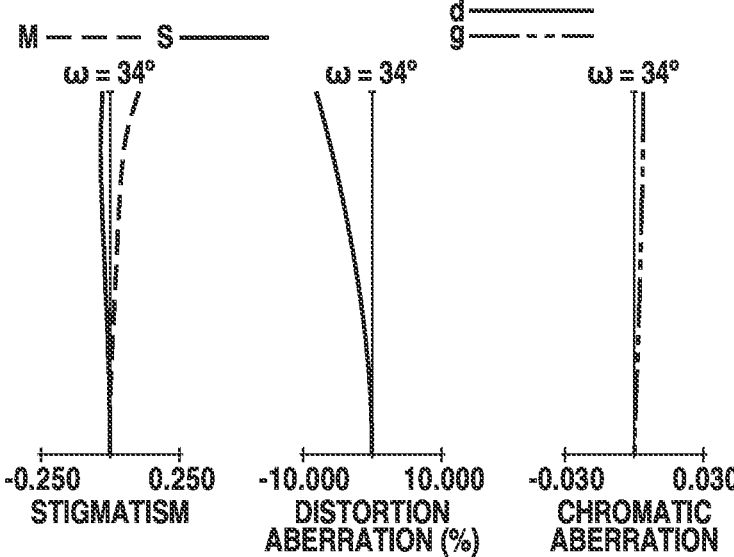
Fno = 5.11     M — — — S ———     ω = 34°     ω = 34°     d ——— g — — —
-0.250   0.250    -0.250   0.250    -10.000   10.000    -0.030   0.030
SPHERICAL ABERRATION    STIGMATISM    DISTORTION ABERRATION (%)    CHROMATIC ABERRATION
FIG.12C
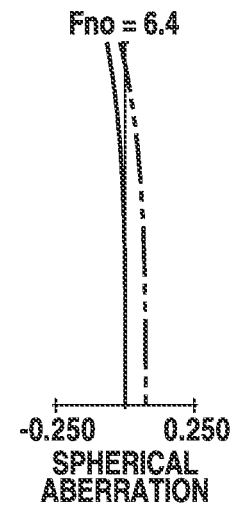
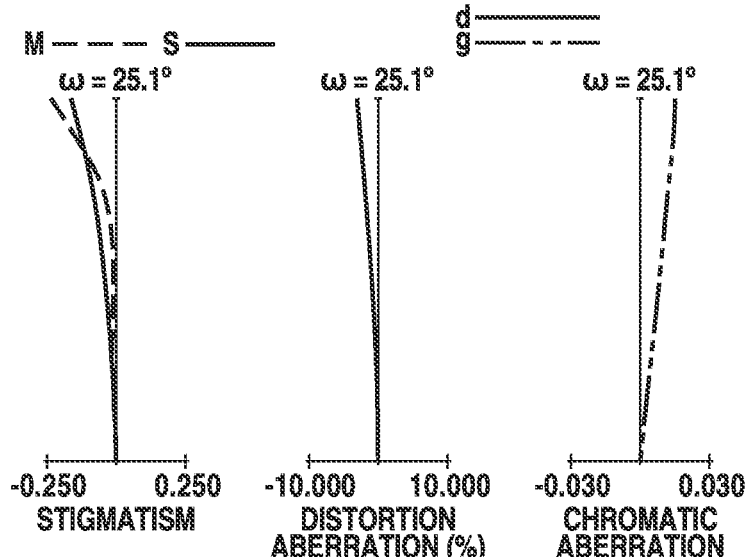
Fno = 6.4     M — — — S ———     ω = 25.1°     ω = 25.1°     d ——— g — — —
-0.250   0.250    -0.250   0.250    -10.000   10.000    -0.030   0.030
SPHERICAL ABERRATION    STIGMATISM    DISTORTION ABERRATION (%)    CHROMATIC ABERRATION

FIG.14A
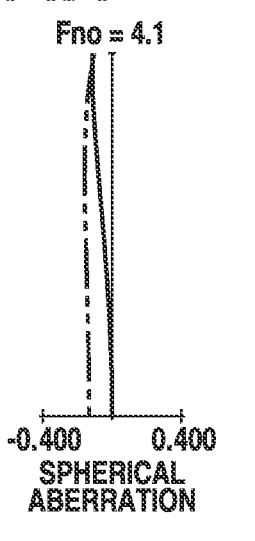
Fno = 4.1
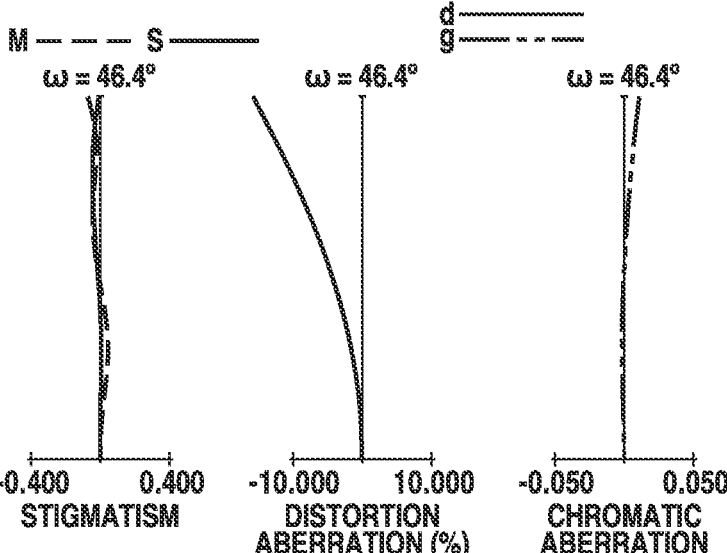
M ———— S ————    d ————  g ———
ω = 46.4°   ω = 46.4°   ω = 46.4°
-0.400    0.400
SPHERICAL
ABERRATION
-0.400    0.400
STIGMATISM
-10.000    10.000
DISTORTION
ABERRATION (%)
-0.050    0.050
CHROMATIC
ABERRATION
FIG.14B
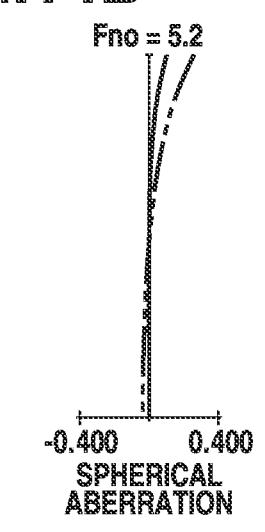
Fno = 5.2
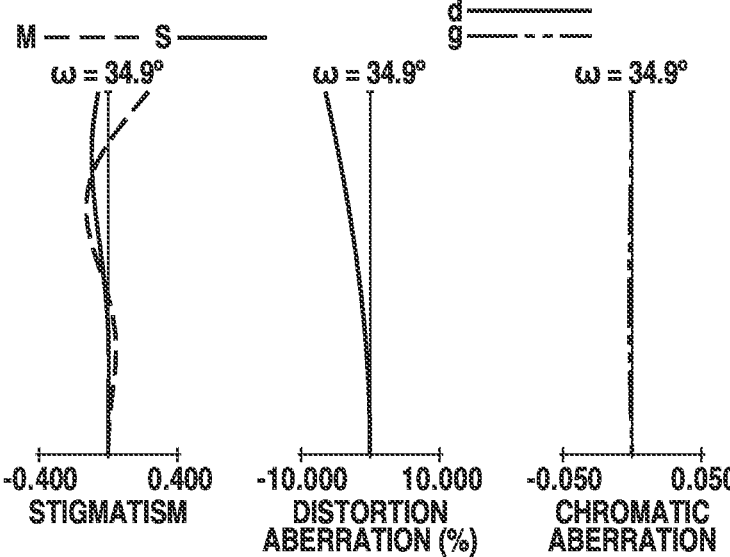
M ———— S ————    d ————  g ———
ω = 34.9°   ω = 34.9°   ω = 34.9°
-0.400    0.400
SPHERICAL
ABERRATION
-0.400    0.400
STIGMATISM
-10.000    10.000
DISTORTION
ABERRATION (%)
-0.050    0.050
CHROMATIC
ABERRATION
FIG.14C
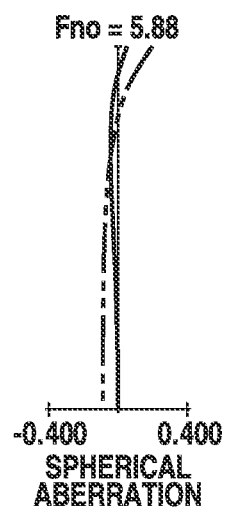
Fno = 5.88
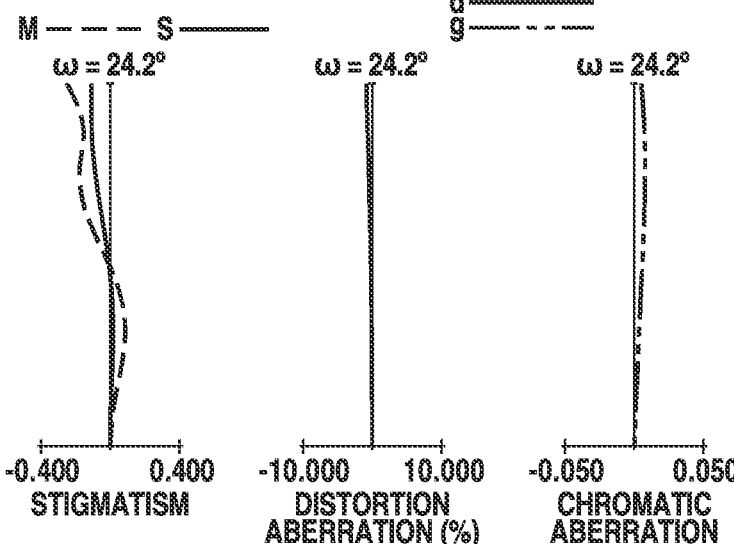
M ———— S ————    d ————  g ———
ω = 24.2°   ω = 24.2°   ω = 24.2°
-0.400    0.400
SPHERICAL
ABERRATION
-0.400    0.400
STIGMATISM
-10.000    10.000
DISTORTION
ABERRATION (%)
-0.050    0.050
CHROMATIC
ABERRATION

FIG.16A
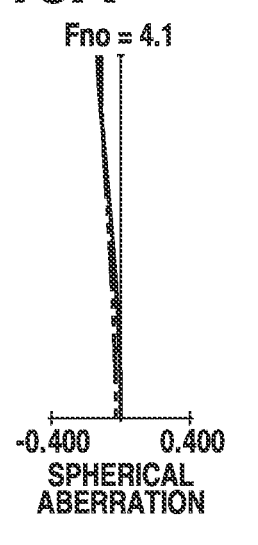
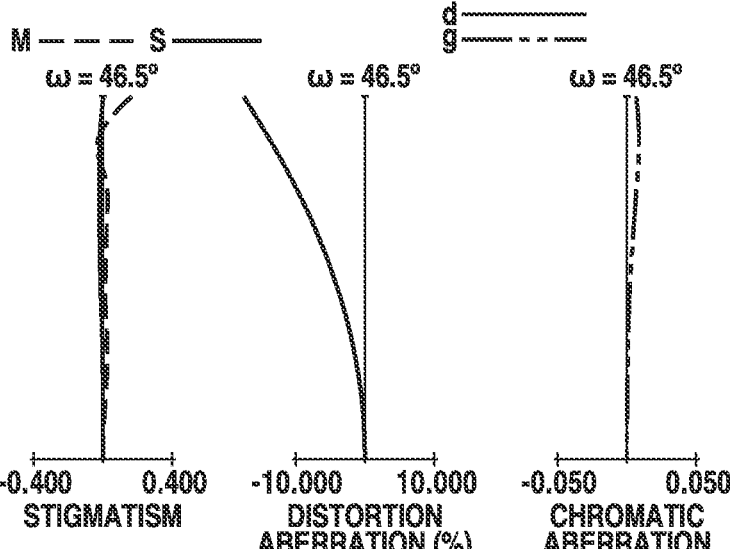
Fno = 4.1
M — — — S ———
d ———
g — — —
ω = 46.5°     ω = 46.5°     ω = 46.5°
-0.400    0.400      -0.400    0.400      -10.000    10.000      -0.050    0.050
SPHERICAL
ABERRATION
STIGMATISM
DISTORTION
ABERRATION (%)
CHROMATIC
ABERRATION
FIG.16B
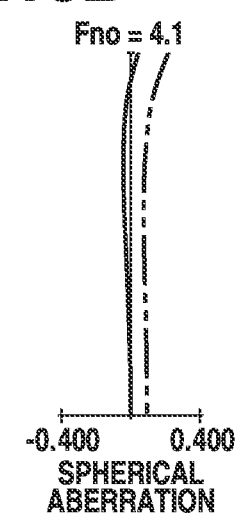
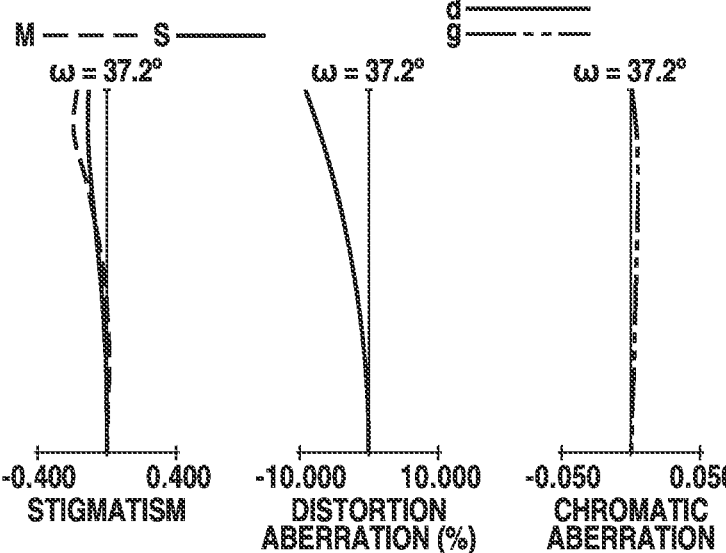
Fno = 4.1
M — — — S ———
d ———
g — — —
ω = 37.2°     ω = 37.2°     ω = 37.2°
-0.400    0.400      -0.400    0.400      -10.000    10.000      -0.050    0.050
SPHERICAL
ABERRATION
STIGMATISM
DISTORTION
ABERRATION (%)
CHROMATIC
ABERRATION
FIG.16C
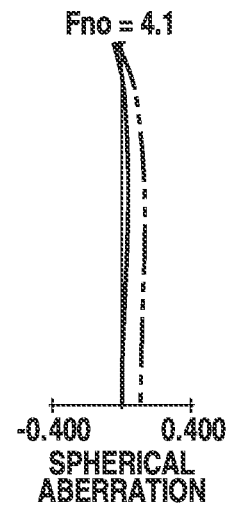
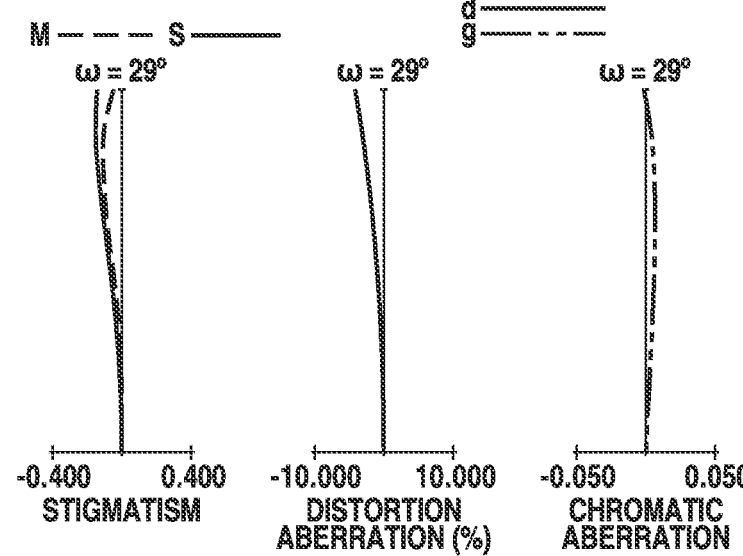
Fno = 4.1
M — — — S ———
d ———
g — — —
ω = 29°     ω = 29°     ω = 29°
-0.400    0.400      -0.400    0.400      -10.000    10.000      -0.050    0.050
SPHERICAL
ABERRATION
STIGMATISM
DISTORTION
ABERRATION (%)
CHROMATIC
ABERRATION

FIG.18A

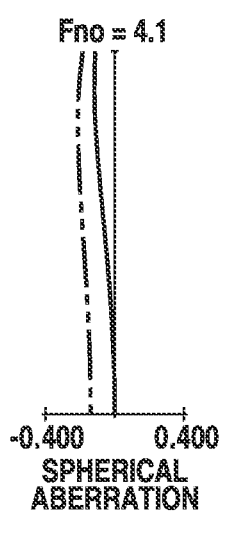
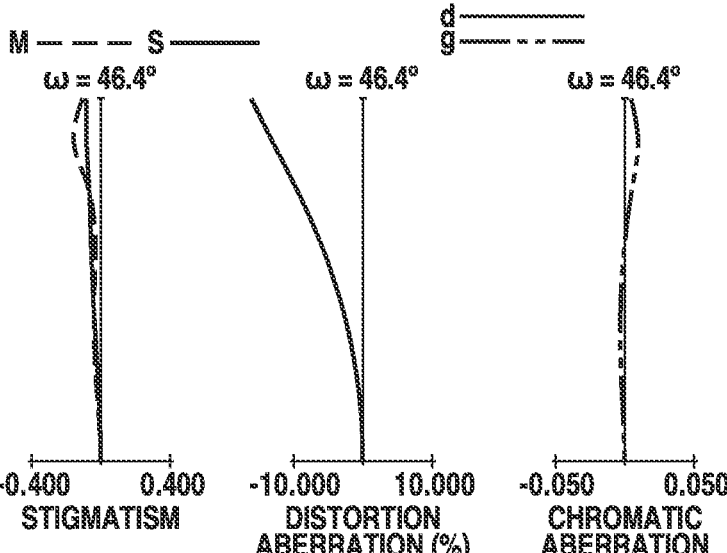

Fno = 4.1    M ─ ─ ─ S ────    ω = 46.4°    ω = 46.4°    d ────── g ─ ─ ─    ω = 46.4°

-0.400    0.400
SPHERICAL
ABERRATION

-0.400    0.400
STIGMATISM

-10.000    10.000
DISTORTION
ABERRATION (%)

-0.050    0.050
CHROMATIC
ABERRATION

FIG.18B

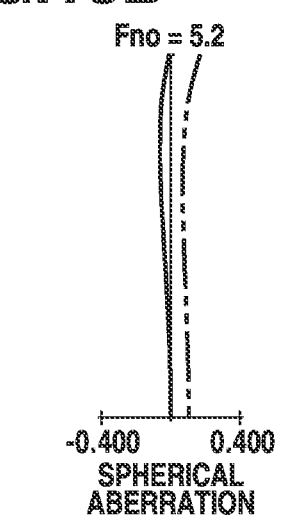
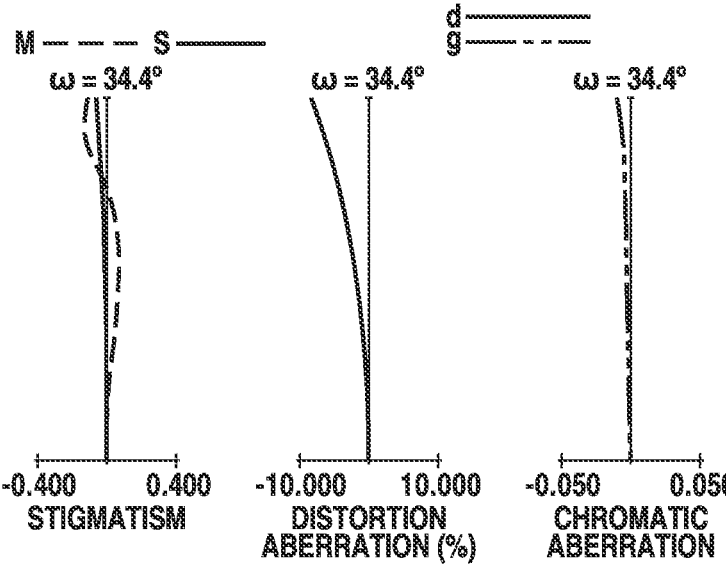

Fno = 5.2    M ─ ─ ─ S ────    ω = 34.4°    ω = 34.4°    d ────── g ─ ─ ─    ω = 34.4°

-0.400    0.400
SPHERICAL
ABERRATION

-0.400    0.400
STIGMATISM

-10.000    10.000
DISTORTION
ABERRATION (%)

-0.050    0.050
CHROMATIC
ABERRATION

FIG.18C

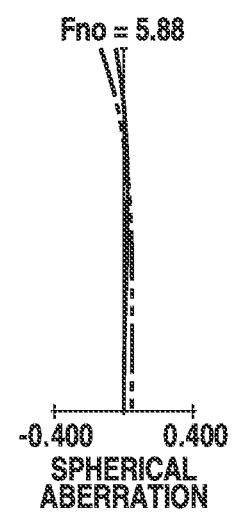
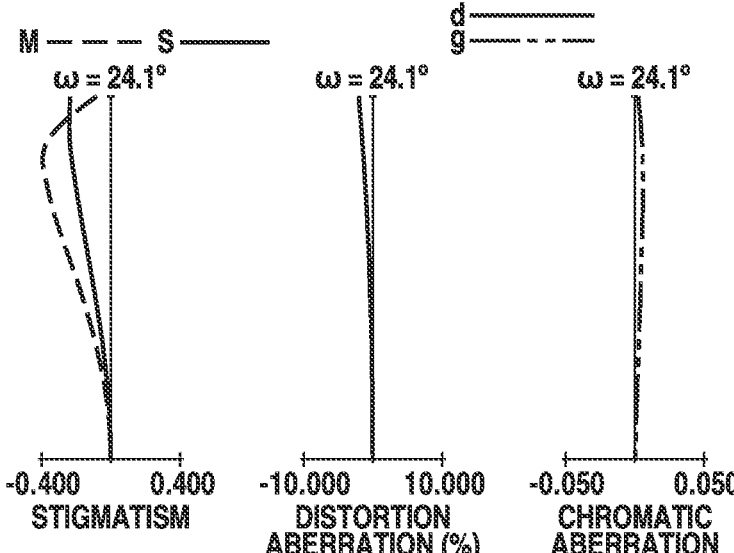

Fno = 5.88    M ─ ─ ─ S ────    ω = 24.1°    ω = 24.1°    d ────── g ─ ─ ─    ω = 24.1°

-0.400    0.400
SPHERICAL
ABERRATION

-0.400    0.400
STIGMATISM

-10.000    10.000
DISTORTION
ABERRATION (%)

-0.050    0.050
CHROMATIC
ABERRATION

ZOOM LENS AND APPARATUS INCLUDING THE SAME

BACKGROUND

Technical Field

The aspect of the embodiments relates to zoom lenses, and is suitable for apparatuses such as digital video cameras, digital still cameras, broadcasting cameras, and silver-halide film cameras.

Description of the Related Art

In recent years, wide-angle zoom lenses having an image stabilizing function have been widely used for moving image capturing. As such wide-angle zoom lenses, optical systems having high optical performance and achieving both a compact size and a wide angle of view have been demanded.

Japanese Patent Application Laid-Open No. 2007-279147 discusses a negative-lead type zoom lens including a second lens unit as an image stabilization unit.

Generally with the increase in the number of lenses moving for image stabilization, an actuator for driving these lenses is likely to increase in size. To achieve the downsizing of the zoom lens, the image stabilization unit that moves for image stabilization is formed of as small a number of lenses as possible.

In the zoom lens discussed in Japanese Patent Application Laid-Open No. 2007-279147, the entire second lens unit serves as an image stabilization unit; thus it is difficult to achieve sufficient downsizing of the zoom lens.

SUMMARY

According to an aspect of the embodiments, a zoom lens includes a first lens unit having a negative refractive power, a second lens unit having a positive refractive power, and a rear lens group including one or more lens units, which are disposed in this order from an object side to an image side, wherein a distance between adjacent lens units changes in zooming, wherein the first lens unit is configured to not move and the second lens unit is configured to move in zooming, wherein the second lens unit includes subunits L2a and L2b having a positive refractive power, which are disposed in this order from the object side, wherein the subunit L2a is configured to move so as to include a component in a direction perpendicular to an optical axis in image stabilization, wherein the rear lens group includes a focus lens unit configured to move in focusing, and wherein the following inequalities are satisfied:

$$0.21<(R1+R2)/(R1-R2)<5.00$$

$$0.1<|f1|/f2<3.0$$

where R1 denotes a curvature radius of a lens surface disposed closest to the object side in the subunit L2a, R2 denotes a curvature radius of a lens surface disposed closest to the image side in the subunit L2a, f1 denotes a focal length of the first lens unit, and f2 denotes a focal length of the second lens unit.

Further features of the disclosure will become apparent from the following description of embodiments with reference to the attached drawings.

BRIEF DESCRIPTION OF THE DRAWINGS

FIGS. 2A, 2B, and 2C are aberration diagrams of the zoom lens at the wide-angle end, an intermediate zoom position, and a telephoto end, respectively, according to the first embodiment.

FIGS. 4A, 4B, and 4C are aberration diagrams of the zoom lens at the wide-angle end, an intermediate zoom position, and a telephoto end, respectively, according to the second embodiment.

FIGS. 10A, 10B, and 10C are aberration diagrams of the zoom lens at the wide-angle end, an intermediate zoom position, and a telephoto end, respectively, according to the fifth embodiment.

FIGS. 12A, 12B, and 12C are aberration diagrams of the zoom lens at the wide-angle end, an intermediate zoom position, and a telephoto end, respectively, according to the sixth embodiment.

FIGS. 14A, 14B, and 14C are aberration diagrams of the zoom lens at the wide-angle end, an intermediate zoom position, and a telephoto end, respectively, according to the seventh embodiment.

FIGS. 16A, 16B, and 16C are aberration diagrams of the zoom lens at the wide-angle end, an intermediate zoom position, and a telephoto end, respectively, according to the eighth embodiment.

FIGS. 18A, 18B, and 18C are aberration diagrams of the zoom lens at the wide-angle end, an intermediate zoom position, and a telephoto end, respectively, according to the ninth embodiment.

DESCRIPTION OF THE EMBODIMENTS

Figure 1:
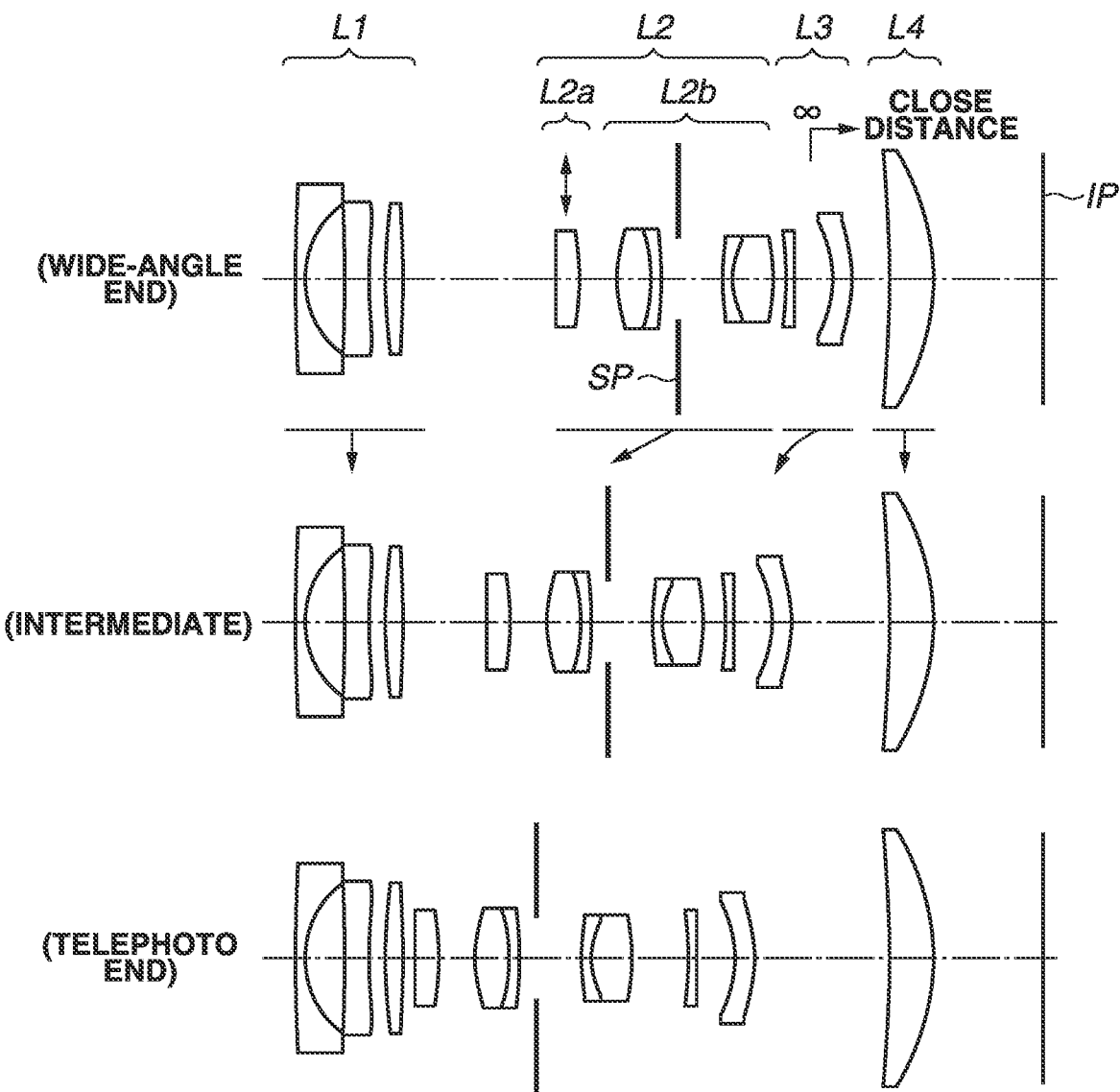
FIG. 1 is a cross-sectional view illustrating a zoom lens at a wide-angle end according to a first embodiment.
Figure 3:
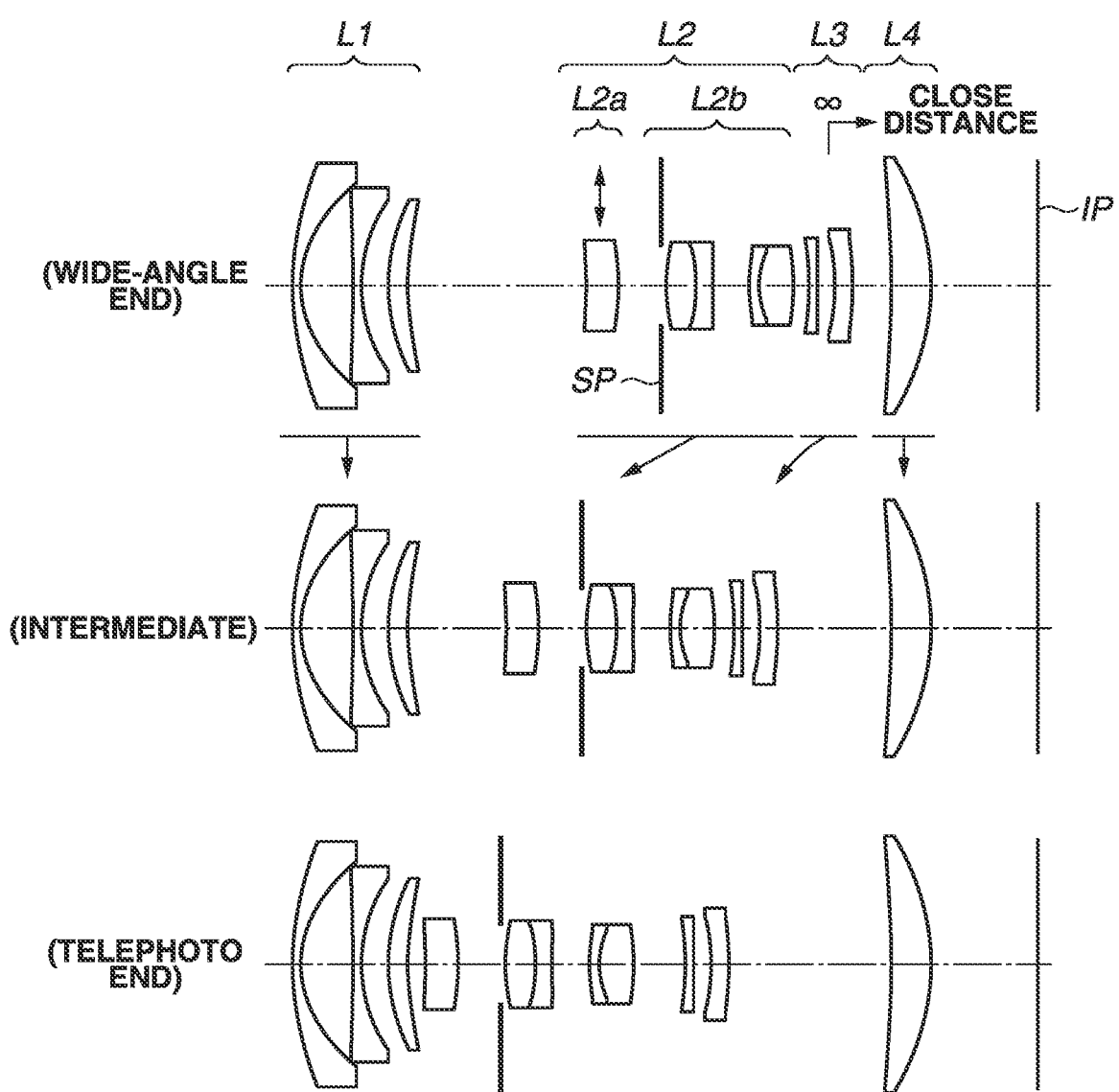
FIG. 3 is a cross-sectional view illustrating a zoom lens at a wide-angle end according to a second embodiment.
Figure 5:
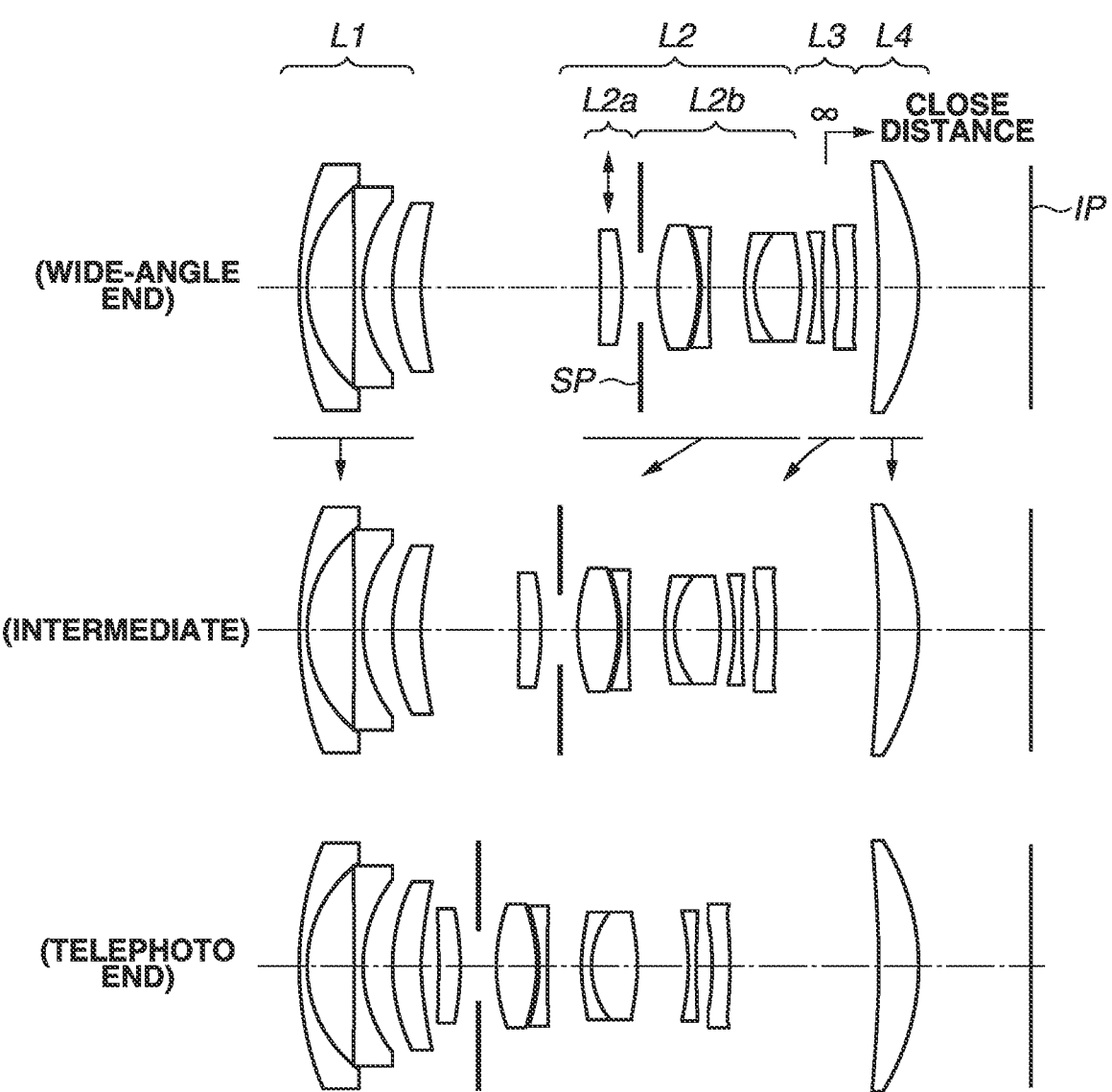
FIG. 5 is a cross-sectional view illustrating a zoom lens at a wide-angle end according to a third embodiment.
Figure 6:
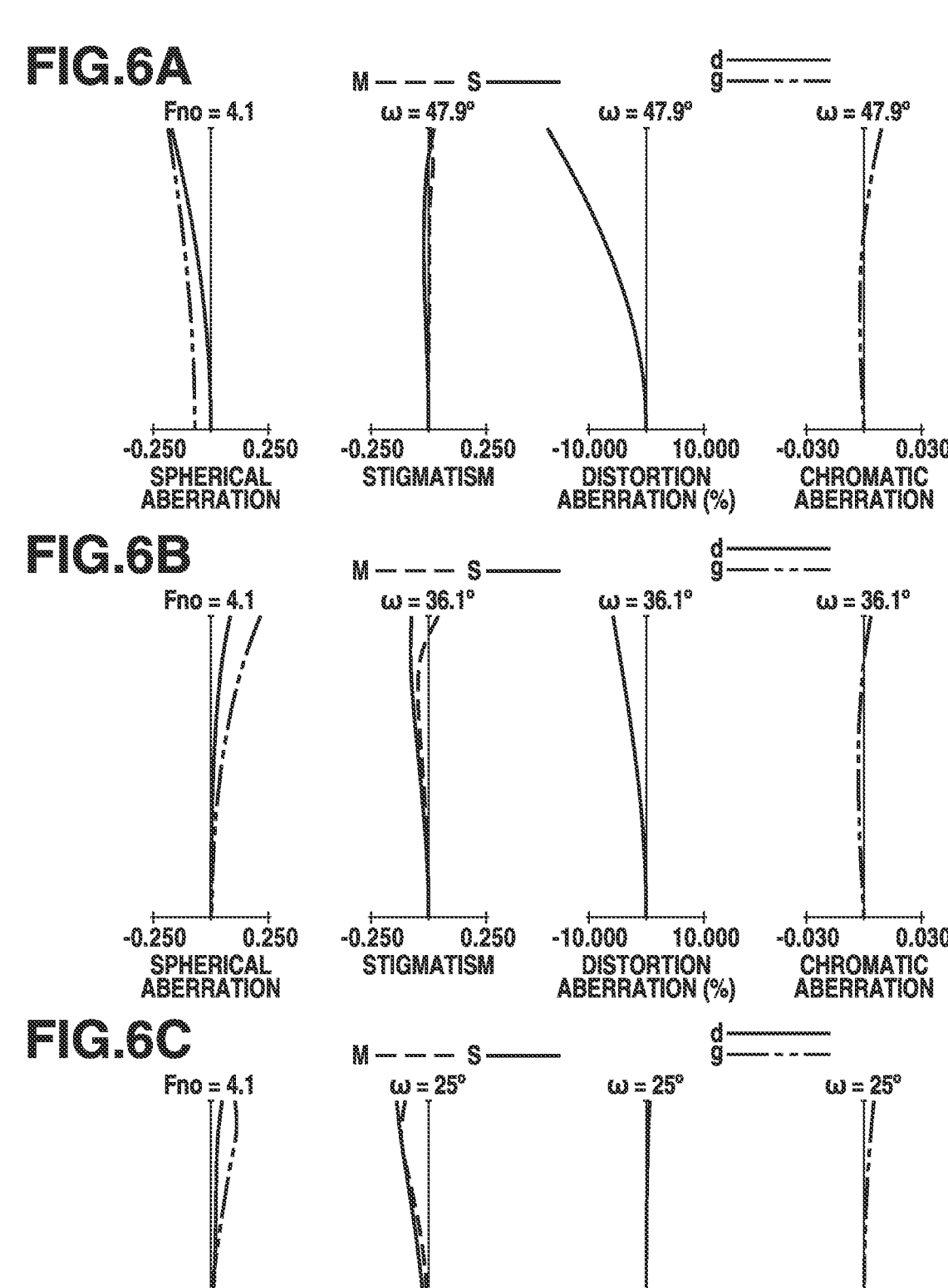
FIGS. 6A, 6B, and 6C are aberration diagrams of the zoom lens at the wide-angle end, an intermediate zoom position, and a telephoto end, respectively, according to the third embodiment.
Figure 7:
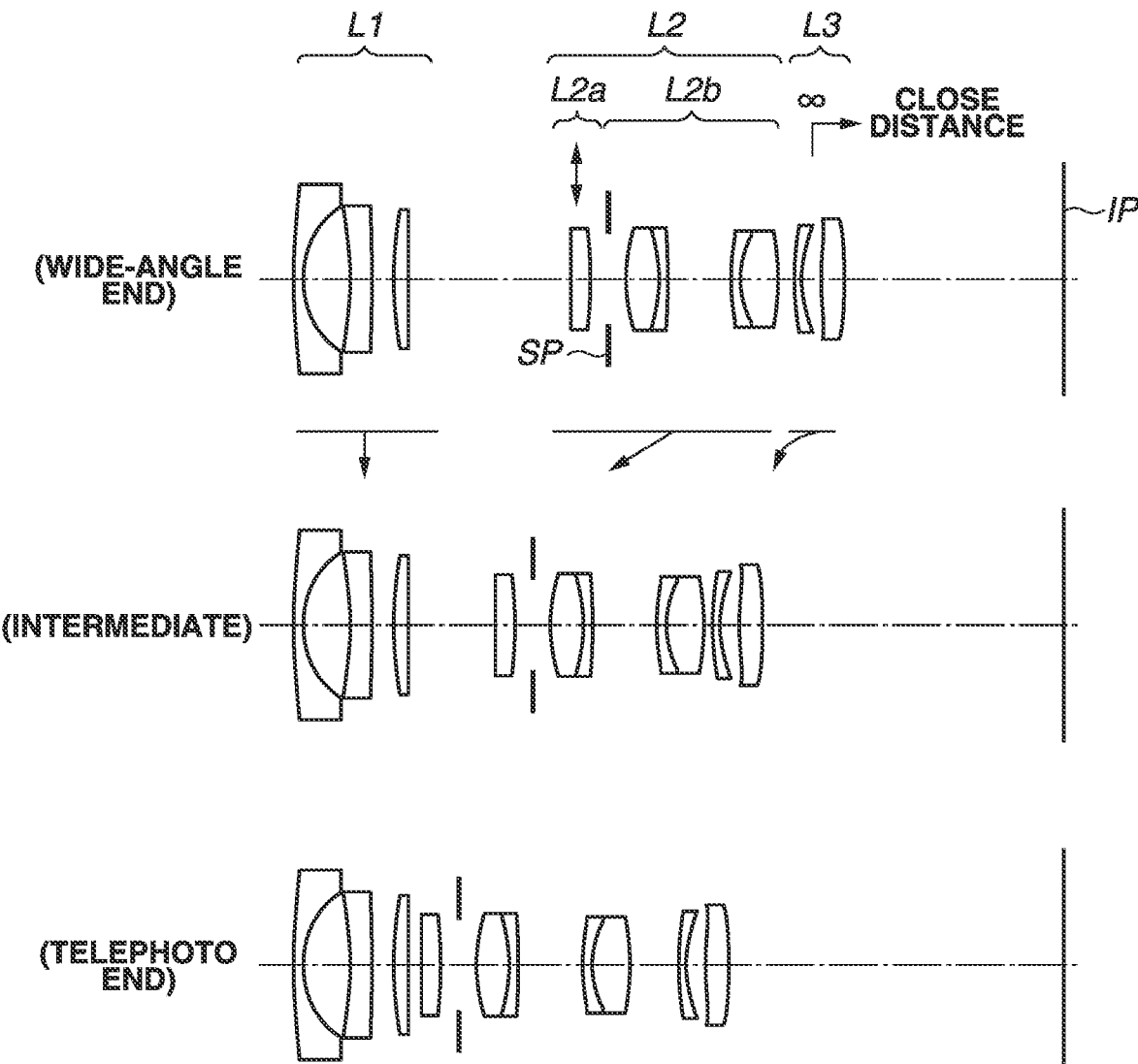
FIG. 7 is a cross-sectional view illustrating a zoom lens at a wide-angle end according to a fourth embodiment.
Figure 8A:
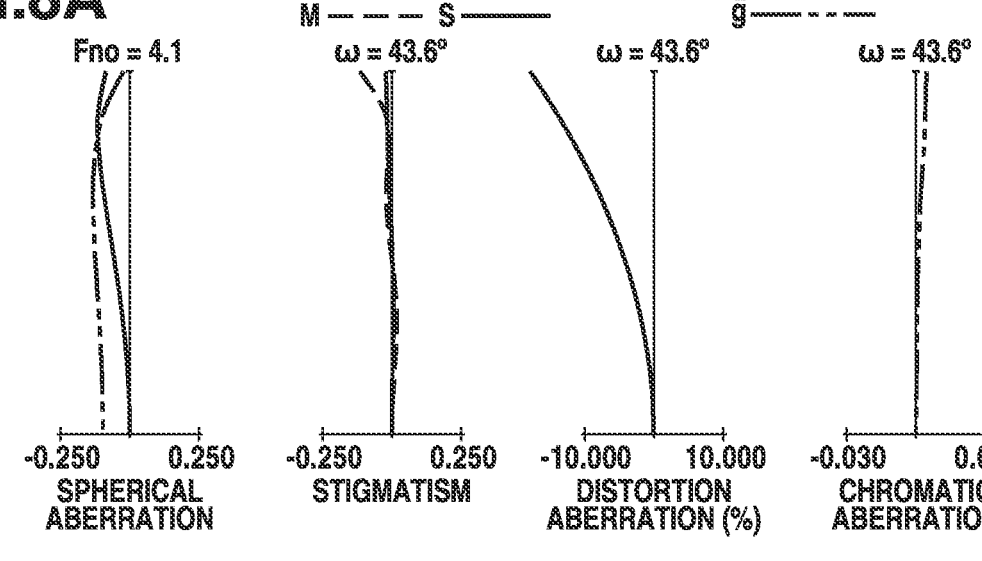
FIGS. 8A, 8B, and 8C are aberration diagrams of the zoom lens at the wide-angle end, an intermediate zoom position, and a telephoto end, respectively, according to the fourth embodiment.
Figure 8B:
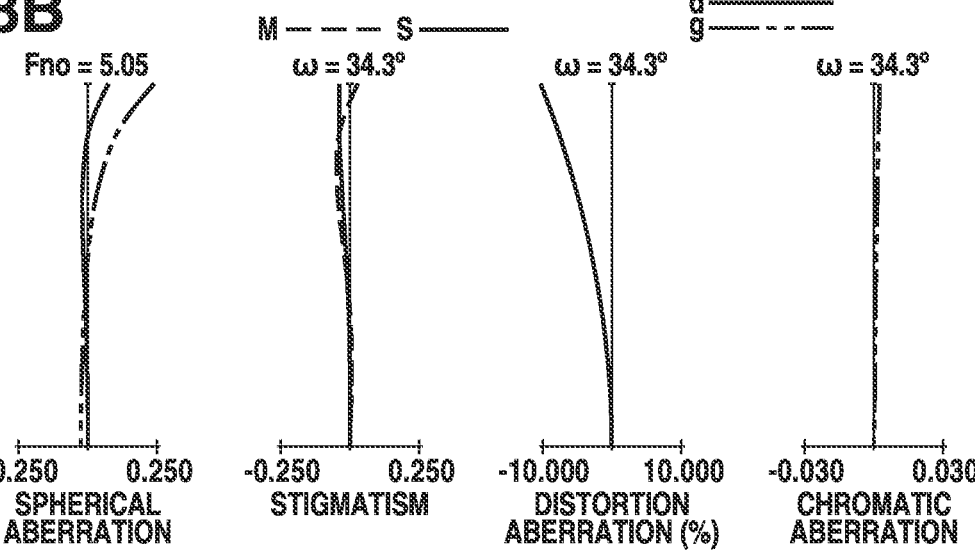
Figure 8C:
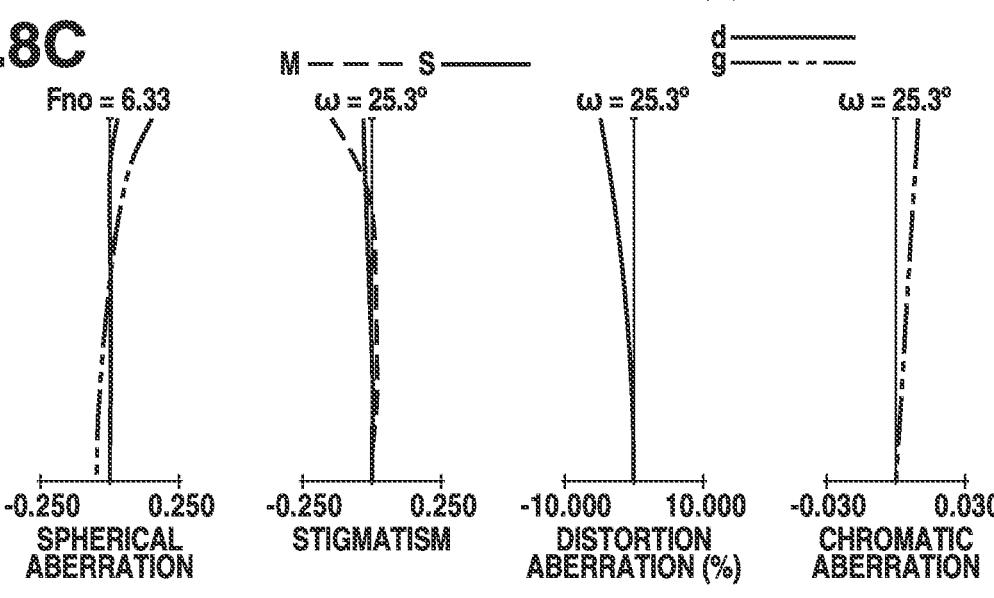
Figure 9:
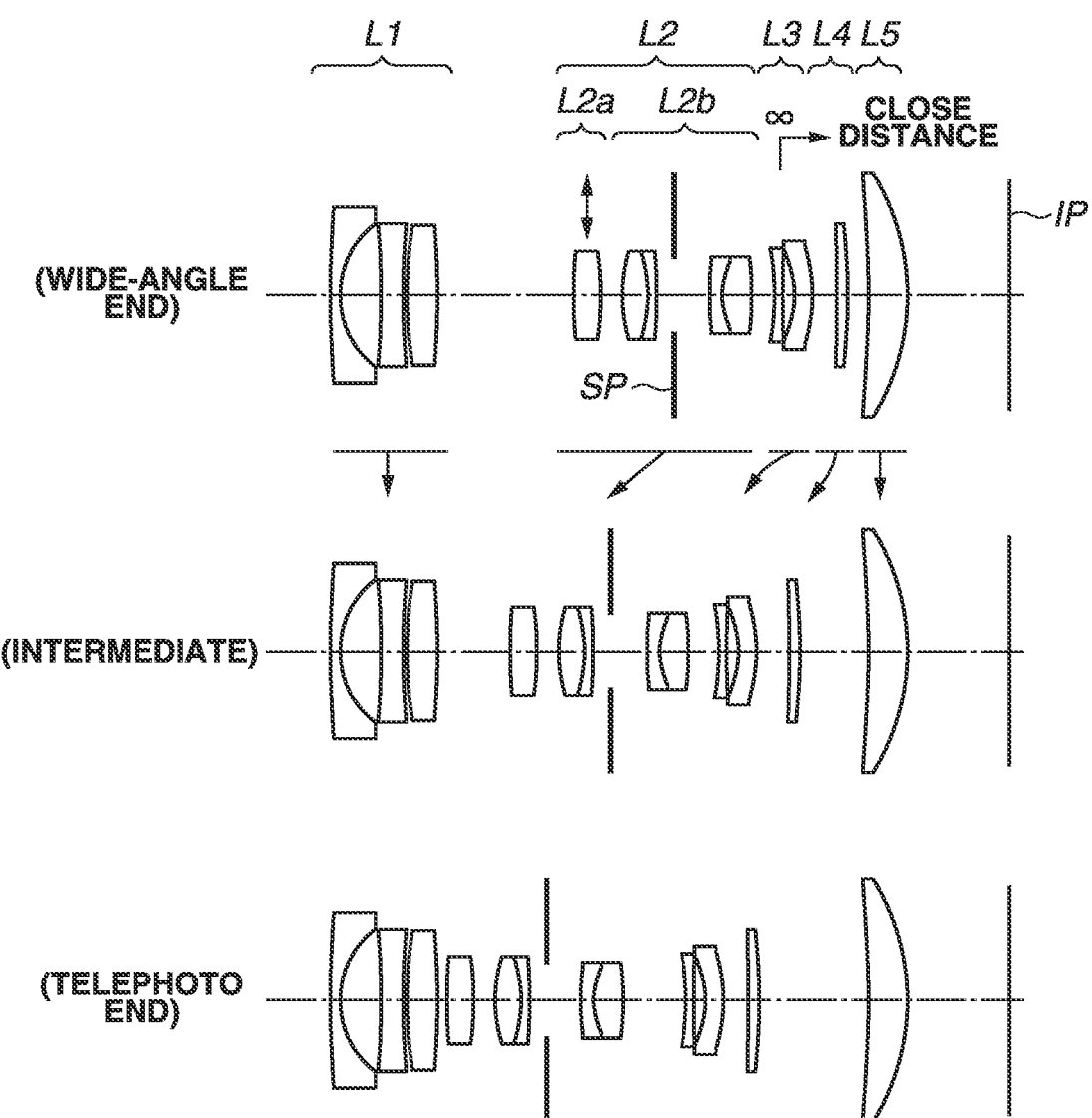
FIG. 9 is a cross-sectional view illustrating a zoom lens at a wide-angle end according to a fifth embodiment.
Figure 11:
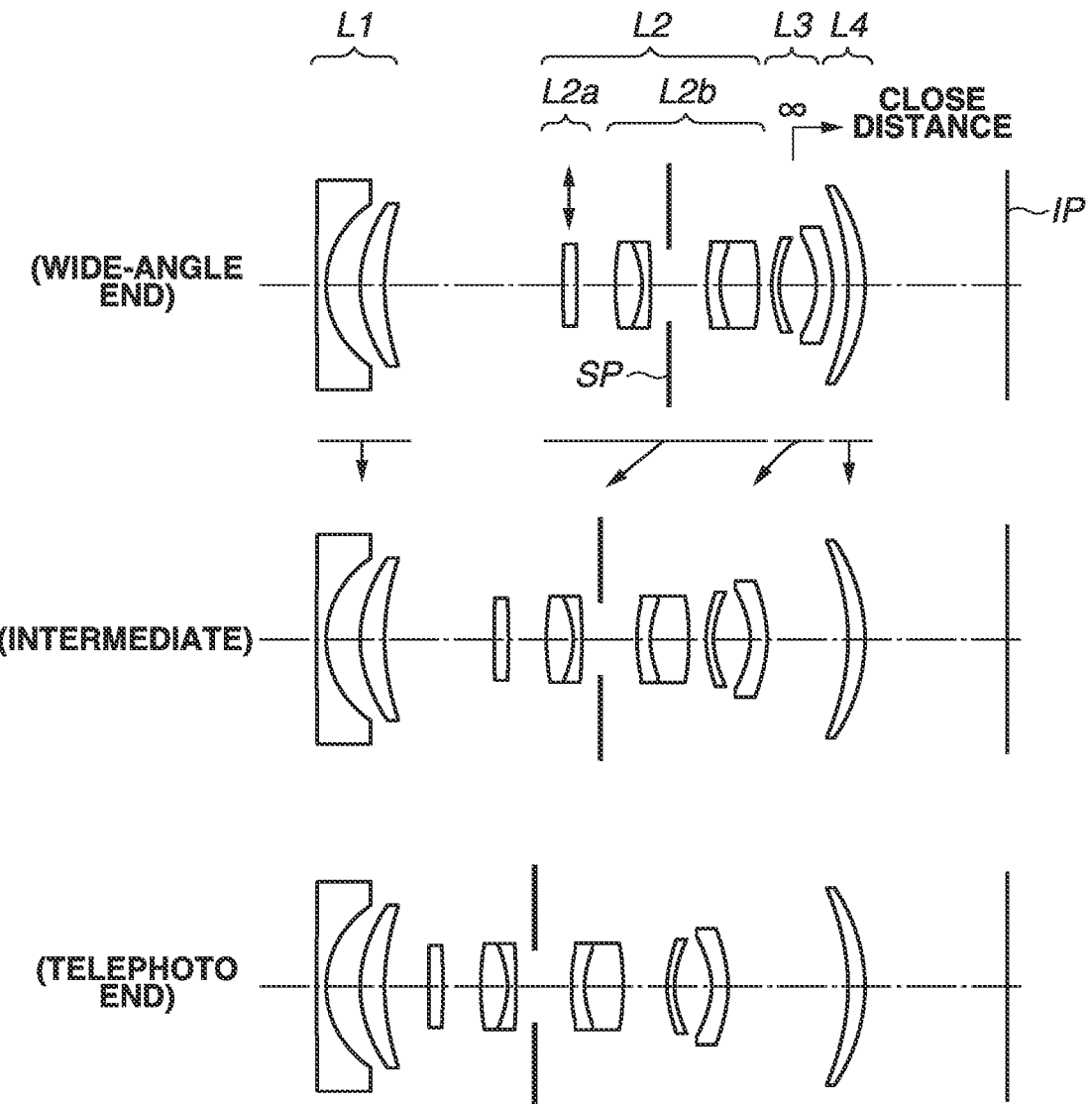
FIG. 11 is a cross-sectional view illustrating a zoom lens at a wide-angle end according to a sixth embodiment.
Figure 13:
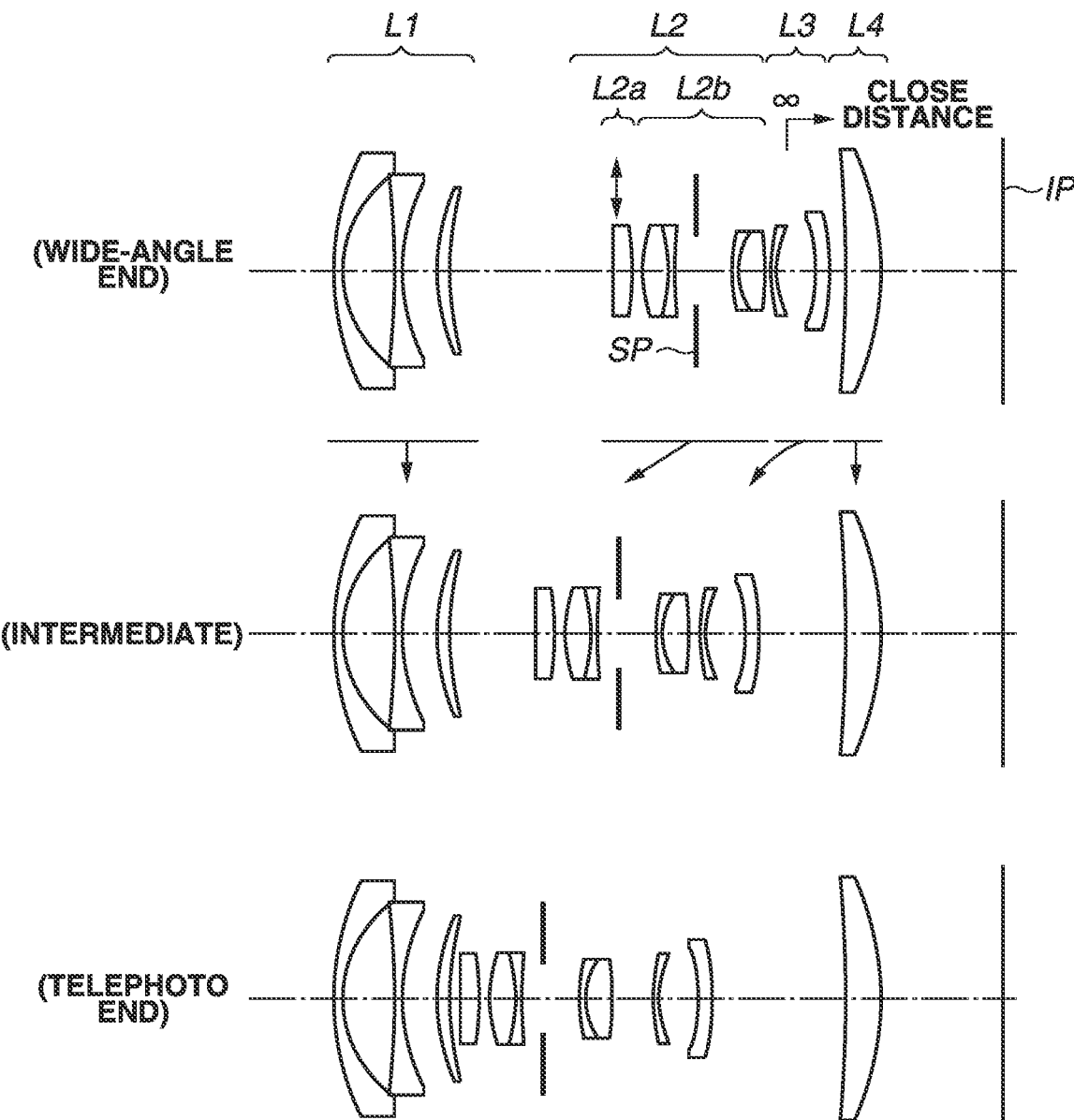
FIG. 13 is a cross-sectional view illustrating a zoom lens at a wide-angle end according to a seventh embodiment.
Figure 15:
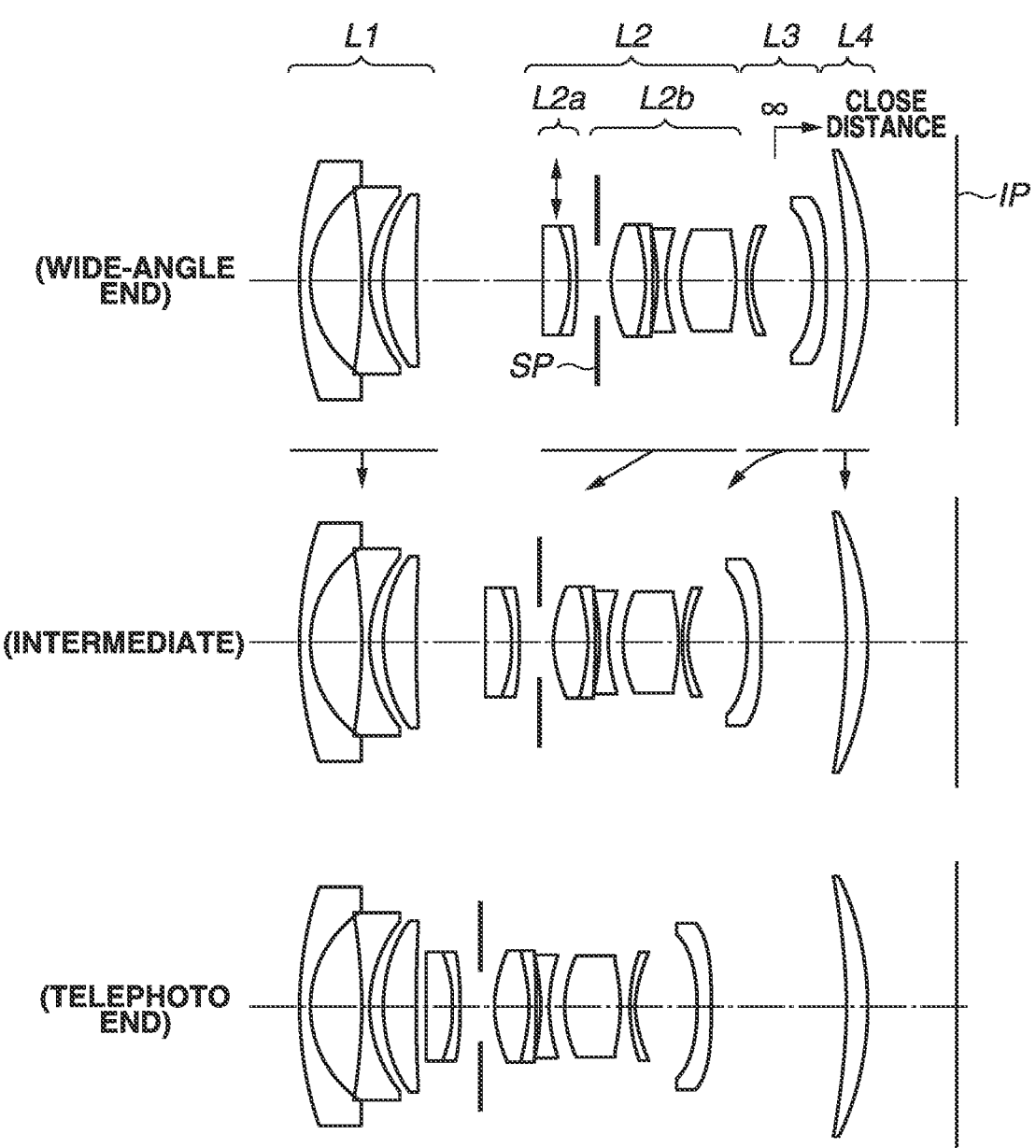
FIG. 15 is a cross-sectional view illustrating a zoom lens at a wide-angle end according to an eighth embodiment.
Figure 17:
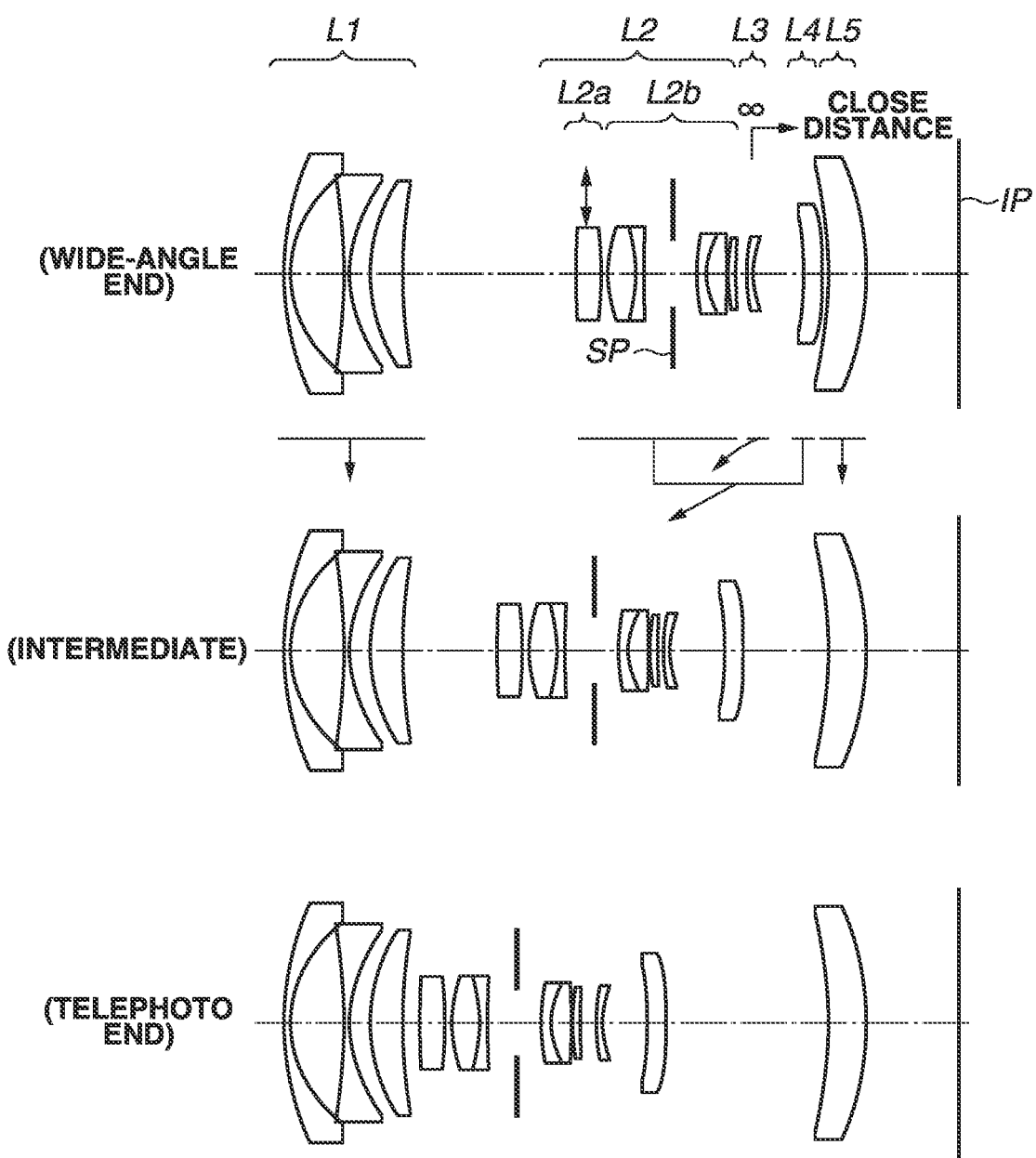
FIG. 17 is a cross-sectional view illustrating a zoom lens at a wide-angle end according to a ninth embodiment.

Embodiments of a zoom lens and an imaging apparatus including the zoom lens according to the disclosure will be described in detail below with reference to the accompanying drawings.

FIGS. 1, 3, 5, 7, 9, 11, 13, 15, and 17 are cross-sectional views illustrating zoom lenses according to a first to a ninth embodiment, respectively. The zoom lens according to each embodiment is used for imaging apparatuses such as digital video cameras, digital still cameras, broadcasting cameras, silver-halide film cameras, monitoring cameras, and vehicle-mounted cameras.

In each cross-sectional view of the zoom lens, the left-hand side is the object side, and the right-hand side is the image side. The zoom lens according to each embodiment can be used as a projection lens for a projector. In this case, the left-hand side is the screen side, and the right-hand side is the to-be-projected image side.

The zoom lens according to each embodiment includes a first lens unit L1 having the negative refractive power, a second lens unit L2 having the positive refractive power, and a rear lens group including at least one lens unit that are disposed in this order from the object side to the image side. In zooming, the distance between adjacent lenses changes. Each lens unit may include one lens or a plurality of lenses. The lens units may include an aperture diaphragm.

Referring to each cross-sectional view, arrows (solid lines) represent moving paths of the lens units during zooming from the wide-angle end to the telephoto end. In focusing from infinity to a close range, the lens units move as indicated by the arrows.

Referring to each cross-sectional view of lenses, SP denotes an aperture diaphragm. In the zoom lens according to each embodiment, the aperture diaphragm SP is included in the second lens unit L2. IP denotes an image plane. When the zoom lens according to each embodiment is used for a digital still camera or digital video camera, the image plane of a solid-state image sensor (photoelectric conversion element) such as a Charge Coupled Device (CCD) sensor and a Complementary Metal Oxide Semiconductor (CMOS) sensor is disposed on the image plane IP. When the zoom lens according to each embodiment is used as an imaging optical system of a silver-halide film camera, a photosensitive surface equivalent to the film surface is disposed on the image plane IP.

FIGS. 2A to 2C, 4A to 4C, 6A to 6C, 8A to 8C, 10A to 10C, 12A to 12C, 14A to 14C, 16A to 16C, and 18A to 18C are aberration diagrams of the zoom lens according to the first to ninth embodiments, respectively, at the wide-angle end when focusing an object on infinity.

Referring to the spherical aberration diagrams, Fno denotes the F number, which indicates the spherical aberration amounts for the d spectral line (587.6 nm wavelength) and the g spectral line (435.8 nm wavelength). Referring to the astigmatism diagrams, S denotes the aberration amount on the sagittal image plane, and M denotes the aberration amount on the meridional image plane. The distortion aberration diagrams each indicate the distortion aberration for the d spectral line. The chromatic aberration diagrams each indicate the magnification chromatic aberration for the g spectral line. ω denotes a half angle of view, i.e., half of the imaging angle of view, (degrees).

A characteristic configuration of the zoom lens according to each embodiment will be described below.

In the zoom lens according to each embodiment, the first lens unit L1 is configured to not move relative to the image plane IP during zooming. Since the first lens unit L1 includes lenses having large outer diameters, the zoom lens is likely to increase in weight. Rapid and quiet zooming can be achieved by keeping the first lens unit L1 immovable. In zooming from the wide-angle end to the telephoto end, the second lens unit L2 moves to the object side, and a third lens unit L3 moves to the object side so as to increase the distance to the second lens unit L2. In focusing from infinity to a close range, the third lens unit L3 moves to the image side. The third lens unit L3 is a focus lens unit that moves in focusing.

These lens units can be made compact and light in weight by disposing the second lens unit L2 and the third lens unit L3, which are configured to move in zooming, in the vicinity of the aperture diaphragm SP. Thus, aberration correction can be achieved over the entire zoom range while reducing the load on the actuator for driving the lens units.

In the zoom lens according to each embodiment, aberration correction is performed by disposing two or more lenses including at least one positive lens and at least one negative lens in the first lens unit L1. The numbers of lenses used for aberration correction in the second lens unit L2 and the third lens unit L3, which are configured to move in zooming, are reduced by satisfactorily correcting off-axis aberrations such as the chromatic aberration and the curvature of field that occur in the first lens unit L1 that is configured to not move in zooming. This contributes to the reduction in size and weight of the lens units that are configured to move in zooming.

The second lens unit L2 includes subunits L2a and L2b having the positive refractive power that are disposed in this order from the object side. According to each embodiment, image blurring in captured images are reduced when the subunit L2a moves so as to components in a direction perpendicular to the optical in image stabilization (image blur correction). The subunit L2a includes one lens element. This contributes to saving the weights of the image stabilization units that are configured to move for image stabilization. A lens element refers to one lens or a cemented lens formed of a plurality of lenses. The image side lens surface of the lens element in the subunit L2a has a convex shape. This prevents an occurrence of eccentric coma aberration at the time of image stabilization.

The aperture diaphragm SP is disposed between the subunits L2a and L2b or in the subunit L2b. This allows the subunit L2a including one lens element to be disposed next to the object side of the aperture diaphragm SP, thereby being able to reduce the size of the lens element forming the subunit L2a. As a result, the size of the drive mechanism for moving the subunit L2a at the time of performing image blur correction can be reduced, thereby being able to prevent an increase in the size of the second lens unit L2.

In the zoom lens according to each embodiment, the third lens unit L3 having the negative refractive power, which is disposed closest to the object side in the rear lens group, is used as a focus lens unit. The focus lens unit can be made compact and light in weight by disposing the focus lens unit next to the image side of the aperture diaphragm SP. Further, at least one of a plurality of lens surfaces included in the rear lens group has an aspherical shape. This makes it possible to obtain high optical performance when focusing on each of the objects from infinity to a close distance.

In the zoom lens according to the first to third and fifth to ninth embodiments, the last lens unit that is configured to not move in zooming is disposed closest to the image side. The last lens unit has the positive refractive power and includes a lens element having a meniscus shape with a convex surface facing toward the image side. This can reduce the incident angle to the image plane while correcting the curvature of field that is an off-axis aberration, thereby securing desired telecentricity. As a result, shading that occurs when a light beam is incident on the image sensor disposed on the image plane.

The zoom lens according to each embodiment is configured to satisfy the following inequalities:

$$0.21 < (R1+R2)/(R1-R2) < 5.00 \tag{1}$$

$$0.1 < |f1/f2| < 3.0 \tag{2}$$

In the inequalities (1) and (2), R1 denotes the radius of curvature of the lens surface closest to the object side in the subunit L2a, R2 denotes the radius of curvature of the lens surface closest to the image side in the subunit L2a, f1 denotes the focal length of the first lens unit L1, and f2 denotes the focal length of the second lens unit L2.

The inequality (1) defines the shape of the subunit L2a. If the upper limit of the inequality (1) is exceeded, the refractive power of the subunit L2a becomes too strong, which results in degradation of the optical performance at the time of image stabilization. For the reason, it is undesirable that the value exceeds the upper limit of the inequality (1). If the value falls below the lower limit of the inequality (1), the refractive power of the subunit L2a becomes too weak, which results in a decrease in the eccentricity sensitivity of the subunit L2a and an increase in the moving amount of the subunit L2a at the time of image stabilization. As a result, it causes an increase in size of an image stabilization unit. For the reason, it is undesirable that the value falls below the lower limit of the inequality (1).

A inequality (2) defines the ratio of the focal length of the first lens unit L1 to that of the second lens unit L2. If the upper limit of the inequality (2) is exceeded, the refractive power of the first lens unit L1 becomes too weak, which results in an increase in the diameter of the lens disposed closest to the object side. In addition, the refractive power of the second lens unit L2 becomes too strong, which results in difficulty in performing good aberration correction. For the reasons, it is undesirable that the value exceeds the upper limit of the inequality (2). If the value falls below the lower limit of the inequality (2), the refractive power of the first lens unit L1 becomes too strong, which results in difficulty in performing good aberration correction. In addition, the refractive power of the second lens unit L2 becomes too weak, which results in difficulty in enhancing the optical magnification of the zoom lens. For the reasons, it is undesirable that the value falls below the lower limit of the inequality (2).

With the above-described configuration, it is possible to realize a small-sized zoom lens with a wide angle of view while providing high optical performance.

According to each embodiment, numerical ranges of the inequalities (1) and (2) are set as follows.

$$0.25 < (R1+R2)/(R1-R2) < 3.00 \tag{1a}$$

$$0.4 < |f1/f2| < 2.3 \tag{2a}$$

In one embodiment, numerical ranges of the inequalities (1) and (2) are set as follows.

$$0.30 < (R1+R2)/(R1-R2) < 2.00 \tag{1b}$$

$$0.7 < |f1/f2| < 2.0 \tag{2b}$$

Further, in another embodiment, the zoom lens according to each embodiment satisfies at least one of the following inequalities:

$$2.2 < f2a/f2 < 6.0 \tag{3}$$

$$1.2 < f2a/ft < 4.5 \tag{4}$$

$$1.6 < f2a/f2b < 5.0 \tag{5}$$

$$0.4 < (1-\beta t2a)*\beta tr < 1.5 \tag{6}$$

$$0.035 < X2asp/TTL < 0.2 \tag{7}$$

$$0.25 < X2a3/TTL < 0.46 \tag{8}$$

$$0.09 < X2asp/(X2asp+X2a3) < 0.4 \tag{9}$$

$$0.1 < |f1|/fw < 3.5 \tag{10}$$

$$1.2 < |f3|/fw < 5.6 \tag{11}$$

$$0.05 < TL1/TTL < 0.2 \tag{12}$$

$$0.4 < BFw/f2 < 1.2 \tag{13}$$

In the inequalities above, f2a denotes the focal length of the subunit L2a, f2b denotes the focal length of the subunit L2b, fw denotes the focal length of the entire system at the wide-angle end, ft denotes the focal length of the entire system at the telephoto end, f3 denotes the focal length of the third lens unit L3, and BFw denotes the back focus of the zoom lens at the wide-angle end.

Further, $\beta t2a$ denotes the lateral magnification of the subunit L2a at the telephoto end, $\beta tr$ denotes the combined lateral magnification of all lenses disposed on the image side of the subunit L2a at the telephoto end, TL1 denotes the total lens length of the first lens unit L1, and TTL denotes the total optical length of the zoom lens. Furthermore, X2asp denotes the distance on the optical axis from the lens surface disposed closest to the object side in the subunit L2a to the aperture diaphragm SP, and X2a3 denotes the distance on the optical axis from the lens surface disposed closest to the object side in the subunit L2a to the lens surface disposed closest to the image side in the focus lens unit at the wide-angle end. The total optical length of the zoom lens indicates the distance on the optical axis from the lens surface disposed closest to the object side in the zoom lens to the image plane IP. The total lens length of the first lens unit L1 indicates the distance on the optical axis from the lens surface disposed closest to the object side in the first lens unit L1 to the lens surface disposed closest to the image side in the first lens unit L1.

The technical meaning of each inequality will be described below. The inequality (3) defines the ratio of the focal length f2a of the subunit L2a to the focal length f2 of the second lens unit L2. If the upper limit of the inequality (3) is exceeded, the refractive power of the subunit L2a becomes too weak, which causes the eccentricity sensitivity of the subunit L2a to be small and the moving amount of the subunit L2a at the time of image stabilization to be increased. As a result, it causes an increase in size of the image stabilization unit. For the reason, it is undesirable that the value exceeds the upper limit of the inequality (3). If the value falls below the lower limit of the inequality (3), the refractive power of the subunit L2a becomes too strong, which results in degradation of the optical performance at the time of image stabilization. For the reason, it is undesirable that the value falls below the lower limit of the inequality (3).

The inequality (4) defines the ratio of the focal length f2a of the subunit L2a to the focal length ft of the entire system at the telephoto end. If the upper limit of the inequality (4) is exceeded, the refractive power of the subunit L2a becomes too weak, which causes the eccentricity sensitivity of the subunit L2a to be small and the moving amount of the subunit L2a at the time of image stabilization to be increased. As a result, it causes an increase in size of the image stabilization unit. For the reason, it is undesirable that the value exceeds the upper limit of the inequality (4). If the value falls below the lower limit of the inequality (4), the refractive power of the subunit L2a becomes too strong, which results in degradation of the optical performance at the time of image stabilization. For the reason, it is undesirable that the value falls below the lower limit of the inequality (4).

The inequality (5) defines the ratio of the focal length f2a of the subunit L2a to the focal length f2b of the subunit L2b. If the upper limit of the inequality (5) is exceeded, the refractive power of the subunit L2a becomes too weak, which causes the eccentricity sensitivity of the subunit L2a to be small and the moving amount of the subunit L2a at the time of image stabilization to be increased. As a result, it causes an increase in size of the image stabilization unit. For the reason, it is undesirable that the value exceeds the upper limit of the inequality (5). If the value falls below the lower limit of the inequality (5), the refractive power of the subunit L2a becomes too strong, which results in the degradation of the optical performance at the time of image stabilization. For the reason, it is undesirable that the value falls below the lower limit of the inequality (5).

The inequality (6) defines the eccentricity sensitivity of the subunit L2a. If the upper limit of the inequality (6) is exceeded, the eccentricity sensitivity of the subunit L2a is excessively increased, which results in degradation of the optical performance at the time of image stabilization. For the reason, it is undesirable that the value exceeds the upper limit of the inequality (6). If the value falls below the lower limit of the inequality (6), the eccentricity sensitivity of the subunit L2a is excessively decreased, which results in an increase in the moving amount of the subunit L2a at the time of image stabilization. As a result, it causes an increase in size of the image stabilization unit. For the reason, it is undesirable that the value falls below the lower limit of the inequality (6).

The inequality (7) defines the ratio of the distance X2asp on the optical axis from the lens surface disposed closest to the object side in the subunit L2a to the aperture diaphragm SP to the total optical length TTL of the zoom lens. If the upper limit of the inequality (7) is exceeded, the size of the second lens unit L2 is increased. For the reason, it is undesirable that the value exceeds the upper limit of the inequality (7). If the value falls below the lower limit of the inequality (7), the distance between the image stabilization unit including the subunit L2a and the aperture diaphragm SP is decreased excessively, which produces the risk of interference therebetween.

The inequality (8) defines the ratio of the distance X2a3 on the optical axis from the lens surface disposed closest to the object side in the subunit L2a to the lens surface disposed closest to the image side in the focus lens unit at the wide-angle end to the total optical length TTL of the zoom lens. If the upper limit of the inequality (8) is exceeded, the size of the second lens unit L2 is increased, thus it is undesirable that the value exceeds the upper limit of the inequality (8). If the value falls below the lower limit of the inequality (8), the distance between the image stabilization unit including the subunit L2a and the aperture diaphragm SP and the distance between the aperture diaphragm SP and a focus unit including the focus lens unit are excessively decreased. As a result, it produces the risk of interference therebetween. For the reason, it is undesirable that the value falls below the lower limit of the inequality (8).

The inequality (9) defines the relation between the distance X2asp on the optical axis from the lens surface disposed closest to the object side in the subunit L2a to the aperture diaphragm SP and the distance X2a3 on the optical axis from the lens surface disposed closest to the object side in the subunit L2a to the lens surface disposed closest to the image side in the focus lens unit at the wide-angle end.

If the upper limit of the inequality (9) is exceeded, the distance between the aperture diaphragm SP and the third lens unit L3 serving as the focus lens unit is increased, which causes an increase in size of the third lens unit L3. For the reason, it is undesirable that the value exceeds the upper limit of the inequality (9). If the value falls below the lower limit of the inequality (9), the distance between the aperture diaphragm SP and the subunit L2a is increased, which causes an increase in size of the subunit L2a. For the reason, it is undesirable that the value falls below the lower limit of the inequality (9).

The inequality (10) defines the ratio of the focal length f1 of the first lens unit L1 to the focal length fw of the entire system at the wide-angle end. If the focal length f1 of the first lens unit L1 is increased above the upper limit of the inequality (10), the refractive power of the first lens unit L1 becomes too weak. As a result, the diameter of the lens disposed closest to the object side in the first lens unit L1 is increased to achieve a wider angle, which results in an increase in size of the entire zoom lens. For the reason, it is undesirable that the value exceeds the upper limit of the inequality (10). If the focal length f1 of the first lens unit L1 is decreased below the lower limit of the inequality (10), the refractive power of the first lens unit L1 becomes too strong. As a result, it causes difficulty in correcting the off-axis aberrations such as the curvature of field satisfactorily.

The inequality (11) defines the ratio of the focal length f3 of the third lens unit L3 to the focal length fw of the entire system at the wide-angle end. If the focal length f3 of the third lens unit L3 is increased above the upper limit of the inequality (11), the refractive power of the third lens unit L3 becomes too weak. As a result, it causes an increase in the moving amount of the third lens unit L3 in focusing, which results in an increase in size of the zoom lens. For the reason, it is undesirable that the value exceeds the upper limit of the inequality (11). If the focal length f3 of the third lens unit L3 is decreased below the lower limit of the inequality (11), the refractive power of the third lens unit L3 becomes too strong. As a result, it causes difficulty in sufficiently reducing the variation in aberration during focusing.

The inequality (12) defines the ratio of the total lens length TL1 of the first lens unit L1 to the total optical length TTL of the zoom lens. If the upper limit of the inequality (12) is exceeded, the first lens unit L1 is increased in size with respect to the total lens length, making it difficult to sufficiently secure the moving amount of the second lens unit L2 that moves in zooming. As a result, it is difficult to obtain a sufficient zooming ratio as a zoom lens. For the reason, it is undesirable that the value exceeds the upper limit of the inequality (12). If the value falls below the lower limit of the inequality (12), the number of lenses disposed in the first lens unit L1 is decreased, which causes difficulty in performing the aberration correction in the first lens unit L1 satisfactorily.

The inequality (13) defines the ratio of the back focus BFw of the zoom lens at the wide-angle end to the focal length f2 of the second lens unit L2. If the upper limit of the inequality (13) is exceeded, the refractive power of the second lens unit L2 becomes too strong, which causes difficulty in correcting the spherical aberration or coma aberration satisfactorily. For the reason, it is undesirable that the value exceeds the upper limit of the inequality (13). If the value falls below the lower limit of the inequality (13), the flange focal length is decreased, resulting in difficulty in securing a space for disposing a shutter member and other members. In one embodiment, the value falls below the lower limit of the inequality (13).

In one embodiment, numerical ranges of the inequalities (3) to (13) are set as follows.

$$2.4 < f2a/f2 < 5.5 \tag{3a}$$

$$1.3 < f2a/ft < 4.2 \tag{4a}$$

$$1.8 < f2a/f2b < 4.7 \tag{5a}$$

$$0.45 < (1-\beta t2a)*\beta Btr < 1.2 \tag{6a}$$

$$0.042 < X2asp/TTL < 0.18 \tag{7a}$$

$$0.28 < X2a3/TTL < 0.45 \tag{8a}$$

$$0.10 < X2asp/(X2asp+X2a3) < 0.35 \tag{9a}$$

$$0.5 < |f1|/fw < 2.5 \tag{10a}$$

$$1.4 < |f3|/fw < 4.0 \tag{11a}$$

$$0.07 < TL1/TTL < 0.19 \tag{12a}$$

$$0.45 < BFw/f2 < 1.0 \tag{13a}$$

In another embodiment, numerical ranges of the inequalities (3) to (13) are set as follows.

$$2.5 < f2a/f2 < 5.2 \tag{3b}$$

$$1.4 < f2a/ft < 3.9 \tag{4b}$$

$$1.9 < f2a/f2b < 4.5 \tag{5b}$$

$$0.48 < (1-\beta t2a)*Btr < 1.1 \tag{6b}$$

$$0.045 < X2asp/TTL < 0.17 \tag{7b}$$

$$0.30 < X2a3/TTL < 0.44 \tag{8b}$$

$$0.11 < X2asp/(X2asp+X2a3) < 0.32 \tag{9b}$$

$$0.8 < |f1|/fw < 1.9 \tag{10b}$$

$$1.45 < |f3|/fw < 3.5 \tag{11b}$$

$$0.08 < TL1/TTL < 0.185 \tag{12b}$$

$$0.5 < BFw/f2 < 0.9 \tag{13b}$$

The configurations of the zoom lenses according to the embodiments will be described in detail below.

The zoom lenses according to the first, second, third, sixth, and seventh embodiments include the first lens unit L1 having the negative refractive power, the second lens unit L2 having the positive refractive power, the third lens unit L3 having the negative refractive power, and a fourth lens unit L4 having the positive refractive power, which are disposed in this order from the object side to the image side. In zooming from the wide-angle end to the telephoto end, the second lens unit L2 moves to the object side, the third lens unit L3 moves to the object side while increasing the distance to the second lens unit L2, and the first lens unit L1 and the fourth lens unit L4 do not move relative to the image plane IP. In focusing from infinity to a close distance, the third lens unit L3 moves to the image side.

The zoom lens according to the fourth embodiment includes the first lens unit L1 having the negative refractive power, the second lens unit L2 having the positive refractive power, and the third lens unit L3 having the negative refractive power, which are disposed in this order from the object side to the image side. In zooming from the wide-angle end to the telephoto end, the second lens unit L2 monotonically moves to the object side. In zooming from the wide-angle end up to the intermediate zoom position, the third lens unit L3 moves to the object side while decreasing the distance to the second lens unit L2. In zooming from the intermediate zoom position to the telephoto end, the third lens unit L3 moves to the object side while increasing the distance to the second lens unit L2. In zooming, the first lens unit L1 does not move relative to the image plane IP. In focusing from infinity to a close distance, the third lens unit L3 moves to the image side.

The zoom lens according to the fifth embodiment includes the first lens unit L1 having the negative refractive power, the second lens unit L2 having the positive refractive power, the third lens unit L3 having the negative refractive power, the fourth lens unit L4 having the positive refractive power, and a fifth lens unit L5 having the positive refractive power, which are disposed in this order from the object side to the image side. In zooming from the wide-angle end to the telephoto end, the second lens unit L2 monotonically moves to the object side, and the third lens unit L3 monotonically moves to the object side while increasing the distance to the second lens unit L2. In zooming from the wide-angle end to the intermediate zoom position, the fourth lens unit L4 moves to the object side while increasing the distance to the third lens unit L3. In zooming from the intermediate zoom position to the telephoto end, the fourth lens unit L4 moves to the object side while decreasing the distance to the third lens unit L3. In zooming, the first lens unit L1 and the fifth lens unit L5 do not move relative to the image plane IP. In focusing from infinity to a close distance, the third lens unit L3 moves to the image side.

The zoom lens according to the eighth embodiment includes the first lens unit L1 having the negative refractive power, the second lens unit L2 having the positive refractive power, the third lens unit L3 having the negative refractive power, and the fourth lens unit LA having the positive refractive power, which are disposed in this order from the object side to the image side. In zooming from the wide-angle end to the telephoto end, the second lens unit L2 monotonically moves to the object side. In zooming from the wide-angle end to the intermediate zoom position, the third lens unit L3 moves to the object side while decreasing the distance to the second lens unit L2. In zooming from the intermediate zoom position to the telephoto end, the third lens unit L3 moves to the object side while increasing the distance to the second lens unit L2. In zooming, the first lens unit L1 and the fourth lens unit L4 do not move relative to the image plane IP. In focusing from infinity to a close distance, the third lens unit L3 moves to the image side.

The zoom lens according to the ninth embodiment includes the first lens unit L1 having the negative refractive power, the second lens unit L2 having the positive refractive power, the third lens unit L3 having the negative refractive power, the fourth lens unit L4 having the negative refractive power, and the fifth lens unit L5 having the positive refractive power, which are disposed in this order from the object side to the image side. In zooming from the wide-angle end to the telephoto end, the second lens unit L2 and the fourth lens unit L4 monotonically move to the object side along the same locus, and the third lens unit L3 monotonically moves to the object side while increasing the distance to the second lens unit L2. In zooming, the first lens unit L1 and the fifth lens unit L5 do not move relative to the image plane IP. In focusing from infinity to a close distance, the third lens unit L3 moves to the image side.

In each of the embodiments, the first lens unit L1 is configured to not move in zooming, so that inclination of the first lens unit L1 is prevented in zooming, thereby improving the optical performance.

First to ninth numerical examples corresponding to the first to ninth embodiments, respectively, will be described below.

In surface data of each numerical example, r denotes the curvature radius of each optical surface, d (mm) denotes the on-axis distance (distance on the optical axis) between the m-th surface and the (m+1)-th surface, and m denotes the surface number counted from the light incidence side. Further, nd denotes the index of refraction for the d spectral line of each optical member, and vd denotes the Abbe number of each optical member. The Abbe number vd of a certain material is represented by:

$$vd=(Nd-1)/(NF-NC)$$

where Nd, NF and NC denote the refractive indices of the Fraunhofer d spectral line (587.6 nm wavelength), F spectral line (486.1 nm wavelength), and C spectral line (656.3 nm wavelength).

The focal length (mm), F number, and the half angle of view (degrees) are values obtained in a state where the zoom lens focuses on an object at infinity. The total lens length is the distance on the optical axis from the lens surface disposed closest to the object side to the last surface (the lens surface disposed closest to the image side) in the zoom lens with the back focus BF added thereto. The back focus BF is the distance from the last surface of the zoom lens to the image plane.

In a case where the optical surface is an aspheric surface, an asterisk (*) mark is appended on the right-hand side of the surface number. The aspherical shape is represented by $$x=(h2/R)/[1+\{1-(1+k)(h/R)2\}^{1/2}]+A4*h4+A6*h6+A8*h8$$

where X denotes the displacement from the surface vertex in the optical axis direction, h denotes the height from the optical axis in the direction perpendicular to the optical axis, R denotes the paraxial curvature radius, k denotes the conic constant, and A4, A6, A8 . . . denote the aspheric surface coefficients of respective orders. Further, "e±XX" in each aspherical coefficient means "*10±XX".

FIRST NUMERICAL EXAMPLE

Unit: mm

Surface Data

| Surface No. | r | d | nd | vd |
|---|---|---|---|---|
| 1 | 235.833 | 1.00 | 1.77250 | 49.6 |
| 2 | 10.085 | 4.16 | | |
| 3* | −895.559 | 2.50 | 1.53110 | 55.9 |
| 4* | 44.647 | 1.74 | | |
| 5 | 64.099 | 1.78 | 2.05090 | 26.9 |
| 6 | −162.178 | (Variable) | | |
| 7 | −459.615 | 2.29 | 1.48749 | 70.2 |
| 8 | −33.943 | 4.00 | | |

-continued

Unit: mm

| | | | | |
|---|---|---|---|---|
| 9 | 18.560 | 3.57 | 1.69680 | 55.5 |
| 10 | −16.150 | 1.00 | 1.90043 | 37.4 |
| 11 | −62.644 | 1.84 | | |
| 12 (Diaphragm) | ∞ | 4.68 | | |
| 13 | 25.922 | 1.00 | 1.83481 | 42.7 |
| 14 | 8.456 | 4.21 | 1.49700 | 81.5 |
| 15 | −26.343 | (Variable) | | |
| 16 | −34.878 | 0.80 | 1.61772 | 49.8 |
| 17 | 139.823 | 4.14 | | |
| 18* | −9.417 | 2.00 | 1.53110 | 55.9 |
| 19* | −12.991 | (Variable) | | |
| 20 | −120.000 | 4.63 | 1.63854 | 55.4 |
| 21 | −24.348 | 11.50 | | |
| Image Plane | ∞ | | | |

Aspheric Surface Data

Surface No. 3

K = 0.00000e+00 A4 = −8.12193e−05 A6 = 8.99724e−07
A8 = −1.19209e−08

Surface No. 4

K= 0.00000e+00 A4 = −1.28410e−04 A6 = 3.69150e−07
A8 = −1.09948e−08

Surface No. 18

K = 0.00000e+00 A4 = 2.77887e−04 A6 = 6.15575e−06
A8 = −2.56537e−08

Surface No. 19

K = 0.00000e+00 A4 = 2.14784e−04 A6 = 3.85389e−06
A8 = −2.47687e−08

Various Data

| Zoom Ratio | | 2.02 | |
|---|---|---|---|

| | Wide Angle | Intermediate | Telephoto |
|---|---|---|---|
| Focal Length | 14.40 | 20.23 | 29.10 |
| F Number | 4.10 | 5.04 | 6.40 |
| Half Angle of View | 43.34 | 33.98 | 25.11 |
| Image Height | 11.42 | 12.56 | 13.22 |
| Total Optical Length | 78.52 | 78.52 | 78.52 |
| BF | 11.50 | 11.50 | 11.50 |
| d6 | 16.23 | 8.82 | 1.41 |
| d15 | 1.45 | 2.48 | 6.02 |
| d19 | 3.98 | 10.37 | 14.24 |

Zoom Lens Unit Data

| Unit | Starting Surface | Focal Length |
|---|---|---|
| 1 | 1 | −18.40 |
| 2 | 7 | 18.55 |
| 3 | 16 | −28.78 |
| 4 | 20 | 46.95 |

SECOND NUMERICAL EXAMPLE

Unit: mm
Surface Data

| Surface No. | r | d | nd | vd |
|---|---|---|---|---|
| 1 | 34.396 | 1.00 | 1.77250 | 49.6 |
| 2 | 13.292 | 5.69 | | |
| 3 | −323.606 | 1.00 | 1.59282 | 68.6 |
| 4 | 16.748 | 2.92 | | |
| 5 | 20.652 | 2.29 | 1.84666 | 23.8 |
| 6 | 36.566 (Variable) | | | |
| 7 | −301.068 | 3.73 | 1.48749 | 70.2 |
| 8 | −30.039 | 4.78 | | |
| 9 (Diagram) | ∞ | 0.50 | | |
| 10 | 19.485 | 3.34 | 1.83481 | 42.7 |
| 11 | −14.251 | 1.90 | 1.90366 | 31.3 |
| 12 | ∞ | 4.14 | | |
| 13 | 25.728 | 1.00 | 1.83481 | 42.7 |
| 14 | 9.171 | 3.79 | 1.49700 | 81.5 |
| 15 | −26.368 (Variable) | | | |
| 16 | −23.072 | 0.80 | 1.51742 | 52.4 |
| 17 | 82.694 | 2.02 | | |
| 18* | −15.829 | 2.00 | 1.53110 | 55.9 |
| 19* | −21.570 (Variable) | | | |
| 20 | −120.000 | 4.42 | 1.77250 | 49.6 |
| 21 | −27.671 | 12.13 | | |
| Image Plane | ∞ | | | |

Aspheric Surface Data

Surface No. 18

K = 0.00000e+00    A4 = 3.32711e−04    A6 = 1.73403e−06    A8 = −1.45204e−08

Surface No. 19

K = 0.00000e+00    A4 = 3.39522e−04    A6 = 1.63472e−06    A8 = −1.61755e−08

Various Data

Zoom Ratio    2.35

| | Wide Angle | Intermediate | Telephoto |
|---|---|---|---|
| Focal Length | 12.40 | 18.66 | 29.10 |
| F Number | 4.10 | 5.10 | 6.40 |
| Half Angle of View | 47.91 | 36.37 | 25.20 |
| Image Height | 11.38 | 12.87 | 13.66 |
| Total Optical Length | 83.44 | 83.44 | 83.44 |
| BF | 12.13 | 12.13 | 12.13 |
| d6 | 19.82 | 10.85 | 1.88 |
| d15 | 1.77 | 2.36 | 6.01 |
| d19 | 4.41 | 12.78 | 18.10 |

Zoom Lens Unit Data

| Unit | Starting Surface | Focal Length |
|---|---|---|
| 1 | 1 | −18.26 |
| 2 | 7 | 17.57 |
| 3 | 16 | −27.60 |
| 4 | 20 | 45.60 |

THIRD NUMERICAL EXAMPLE

Unit: mm
Surface Data

| Surface No. | r | d | nd | vd |
|---|---|---|---|---|
| 1 | 35.706 | 1.00 | 1.77250 | 49.6 |
| 2 | 14.414 | 5.20 | | |
| 3 | −441.444 | 1.00 | 1.59282 | 68.6 |
| 4 | 16.131 | 3.30 | | |
| 5 | 21.292 | 3.27 | 1.84666 | 23.8 |

-continued

| | Unit: mm Surface Data | | | |
| --- | --- | --- | --- | --- |
| 6 | 38.733 (Variable) | | | |
| 7 | −260.840 | 2.46 | 1.48749 | 70.2 |
| 8 | −33.213 | 2.00 | | |
| 9 (Diaphragm) | ∞ | 2.00 | | |
| 10 | 20.926 | 4.64 | 1.85150 | 40.8 |
| 11 | −18.671 | 0.22 | | |
| 12 | −17.428 | 0.80 | 1.85478 | 24.8 |
| 13 | 218.347 | 4.07 | | |
| 14 | 28.492 | 1.00 | 1.72916 | 54.7 |
| 15 | 9.356 | 5.18 | 1.49700 | 81.5 |
| 16 | −24.952 (Variable) | | | |
| 17 | −22.720 | 0.80 | 1.57099 | 50.8 |
| 18 | 148.402 | 1.72 | | |
| 19* | −23.196 | 2.00 | 1.53110 | 55.9 |
| 20* | −30.564 (Variable) | | | |
| 21 | −120.000 | 4.34 | 1.77250 | 49.6 |
| 22 | −27.692 | 12.79 | | |
| Image Plane | ∞ | | | |

| Aspheric Surface Data |
| --- |

| Surface No. 19 |
| --- |

| K = 0.00000e+00 | A4 = 2.94393e−04 | A6 = 7.13003e−07 | A8 = −1.72892e−08 |
| --- | --- | --- | --- |

| Surface No. 20 |
| --- |

| K = 0.00000e+00 | A4 = 3.24911e−04 | A6 = 1.01599e−06 | A8 = −1.72183e−08 |
| --- | --- | --- | --- |

| Various Data |
| --- |

| Zoom Ratio | 2.35 |
| --- | --- |

| | Wide Angle | Intermediate | Telephoto |
| --- | --- | --- | --- |
| Focal Length | 12.40 | 18.69 | 29.10 |
| F Number | 4.10 | 4.10 | 4.10 |
| Half Angle of View | 47.91 | 36.15 | 25.02 |
| Image Height | 11.38 | 12.87 | 13.66 |
| Total Optical Length | 82.02 | 82.02 | 82.02 |
| BF | 12.79 | 12.79 | 12.79 |
| d6 | 19.99 | 10.92 | 1.84 |
| d16 | 1.66 | 2.03 | 5.63 |
| d20 | 2.58 | 11.29 | 16.76 |

| Zoom Lens Unit Data | | |
| --- | --- | --- |
| Unit | Starting Surface | Focal Length |
| 1 | 1 | −19.53 |
| 2 | 7 | 17.94 |
| 3 | 17 | −29.69 |
| 4 | 21 | 45.67 |

FOURTH NUMERICAL EXAMPLE

| | Unit: mm Surface Data | | | |
| --- | --- | --- | --- | --- |
| Surface No. | r | d | nd | vd |
| 1 | 82.262 | 1.00 | 1.72916 | 54.7 |
| 2 | 9.985 | 5.40 | | |
| 3* | −35.385 | 2.50 | 1.53110 | 55.9 |
| 4* | −755.464 | 2.44 | | |
| 5 | 46.902 | 1.64 | 1.85478 | 24.8 |
| 6 | 488.012 (Variable) | | | |
| 7 | −168.032 | 2.24 | 1.48749 | 70.2 |
| 8 | −40.753 | 2.00 | | |
| 9 (Diaphragm) | ∞ | 2.00 | | |
| 10 | 19.791 | 3.74 | 1.63930 | 44.9 |
| 11 | −17.793 | 1.00 | 1.95375 | 32.3 |
| 12 | −76.638 | 7.22 | | |
| 13 | 24.497 | 1.00 | 1.85150 | 40.8 |

-continued

| Unit: mm Surface Data | | | | |
|---|---|---|---|---|
| 14 | 10.262 | 4.36 | 1.49700 | 81.5 |
| 15 | −25.520 (Variable) | | | |
| 16 | 36.329 | 0.80 | 1.69680 | 55.5 |
| 17 | 14.592 | 2.26 | | |
| 18* | 36.106 | 2.60 | 1.53110 | 55.9 |
| 19* | 1223.907 (Variable) | | | |
| Image Plane | ∞ | | | |

| Aspheric Surface Data |
|---|

Surface No. 3

| K = 0.00000e+00 | A4 = 1.18307e−04 | A6 = −1.14848e−06 | A8 = −2.66019e−10 |
|---|---|---|---|

Surface No. 4

| K = 0.00000e+00 | A4 = 5.70551e−05 | A6 = −1.50977e−06 |
|---|---|---|

Surface No. 18

| K = 0.00000e+00 | A4 = −1.86660e−04 | A6 = −6.94419e−07 | A8 = −3.40874e−08 |
|---|---|---|---|

Surface No. 19

| K = 0.00000e+00 | A4 = −2.06765e−04 | A6 = −6.51244e−07 | A8 = −2.70431e−08 |
|---|---|---|---|

Various Data

| Zoom Ratio | 2.02 |
|---|---|

| | Wide Angle | Intermediate | Telephoto |
|---|---|---|---|
| Focal Length | 14.41 | 20.14 | 29.10 |
| F Number | 4.10 | 5.05 | 6.33 |
| Half Angle of view | 43.63 | 34.28 | 25.30 |
| Image Height | 11.29 | 12.33 | 13.08 |
| Total Optical Length | 87.56 | 87.56 | 87.56 |
| BF | 25.00 | 34.37 | 38.09 |
| d6 | 18.51 | 9.99 | 1.47 |
| d15 | 1.85 | 1.00 | 5.80 |
| d19 | 25.00 | 34.37 | 38.09 |

| Zoom Lens Unit Data | | |
|---|---|---|
| Unit | Starting Surface | Focal Length |
| 1 | 1 | −18.09 |
| 2 | 7 | 21.77 |
| 3 | 16 | −76.37 |

FIFTH NUMERICAL EXAMPLE

| Unit: mm Surface Data | | | | |
|---|---|---|---|---|
| Surface No. | r | d | nd | vd |
| 1 | 177.461 | 1.00 | 1.77250 | 49.6 |
| 2 | 10.149 | 4.70 | | |
| 3* | 2488.244 | 2.50 | 1.53110 | 55.9 |
| 4* | 35.412 | 0.48 | | |
| 5 | 60.238 | 3.41 | 2.05090 | 26.9 |
| 6 | −118.172 (Variable) | | | |
| 7 | 123.770 | 3.00 | 1.48749 | 70.2 |
| 8 | −42.890 | 2.49 | | |
| 9 | 18.646 | 2.92 | 1.69680 | 55.5 |
| 10 | −16.758 | 1.00 | 1.90043 | 37.4 |
| 11 | −63.758 | 1.98 | | |
| 12 (Diaphragm) | ∞ | 4.06 | | |
| 13 | 27.377 | 1.50 | 1.83481 | 42.7 |
| 14 | 8.440 | 3.35 | 1.49700 | 81.5 |
| 15 | −27.234 (Variable) | | | |
| 16 | −31.899 | 1.00 | 1.62588 | 35.7 |
| 17 | 100.369 | 1.33 | | |
| 18* | −9.441 | 2.00 | 1.53110 | 55.9 |
| 19* | −14.098 (Variable) | | | |

-continued

| Unit: mm Surface Data | | | | |
| --- | --- | --- | --- | --- |
| 20 | −234.280 | 1.21 | 1.83481 | 42.7 |
| 21 | −70.668 (Variable) | | | |
| 22 | −124.344 | 4.35 | 1.70000 | 48.1 |
| 23 | −25.845 | 11.54 | | |
| Image Plane | ∞ | | | |

| Aspheric Surface Data |
| --- |

| Surface No. 3 |
| --- |

K = 0.00000e+00    A4 = −1.05129e−04   A6 = 1.14729e−06      A8 = −1.08302e−08

| Surface No. 4 |
| --- |

K = 0.00000e+00    A4 = −1.52229e−04   A6 = 7.52009e−07      A8 = −1.12431e−08

| Surface No. 18 |
| --- |

K = 0.00000e+00    A4 = 3.54205e−04    A6 = 6.63452e−06      A8 = −4.72740e−08

| Surface No. 19 |
| --- |

K = 0.00000e+00    A4 = 2.83084e−04    A6 = 3.72348e−06      A8 = −3.73362e−08

| Various Data | | | |
| --- | --- | --- | --- |
| Zoom Ratio | 2.02 | | |

| | Wide Angle | Intermediate | Telephoto |
| --- | --- | --- | --- |
| Focal Length | 14.40 | 20.14 | 29.10 |
| F Number | 4.10 | 5.03 | 6.40 |
| Half Angle of view | 43.34 | 34.18 | 25.12 |
| Image Height | 11.42 | 12.56 | 13.22 |
| Total Optical Length | 77.16 | 77.16 | 77.16 |
| BF | 11.54 | 11.54 | 11.54 |
| d6 | 15.56 | 8.28 | 1.00 |
| d15 | 2.53 | 3.55 | 7.06 |
| d19 | 2.87 | 3.74 | 2.89 |
| d21 | 2.39 | 7.77 | 12.40 |

| Zoom Lens Unit Data | | |
| --- | --- | --- |
| Unit | Starting Surface | Focal Length |
| 1 | 1 | −18.99 |
| 2 | 7 | 17.93 |
| 3 | 16 | −24.27 |
| 4 | 20 | 120.81 |
| 5 | 22 | 45.78 |

SIXTH NUMERICAL EXAMPLE

| Unit: mm Surface Data | | | | |
| --- | --- | --- | --- | --- |
| Surface No. | r | d | nd | vd |
| 1 | 803.531 | 1.00 | 1.80400 | 46.5 |
| 2* | 9.701 | 3.98 | | |
| 3 | 15.152 | 2.72 | 1.85478 | 24.8 |
| 4 | 26.245 (Variable) | | | |
| 5 | 127.703 | 1.70 | 1.65160 | 58.5 |
| 6 | −66.256 | 4.27 | | |
| 7 | 33.710 | 3.14 | 1.72000 | 42.0 |
| 8 | −10.341 | 1.01 | 1.80610 | 33.3 |
| 9 | −62.644 | 2.03 | | |
| 10 (Diaphragm) | ∞ | 4.41 | | |
| 11 | 23.914 | 1.50 | 1.83481 | 42.7 |
| 12 | 10.631 | 4.44 | 1.49700 | 81.5 |
| 13 | −21.854 (Variable) | | | |
| 14 | 13.780 | 0.80 | 1.85478 | 24.8 |
| 15 | 10.678 | 4.14 | | |
| 16* | −9.868 | 2.00 | 1.53110 | 55.9 |
| 17* | −13.822 (Variable) | | | |

-continued

| Unit: mm Surface Data | | | | |
|---|---|---|---|---|
| 18 | −26.595 | 2.00 | 1.90366 | 31.3 |
| 19 | −19.720 | 16.22 | | |
| Image Plane | ∞ | | | |

| Aspheric Surface Data |
|---|

| Surface No. 2 | | | |
|---|---|---|---|
| K = −9.86026e−01 | A4 = 8.02238e−05 | A6 = 1.02101e−07 | A8 = 1.26110e−09 |

| Surface No. 16 | | | |
|---|---|---|---|
| K = 0.00000e+00 | A4 = 1.91375e−04 | A6 = 4.24667e−06 | A8 = −7.26056e−08 |

| Surface No. 17 | | | |
|---|---|---|---|
| K = 0.00000e+00 | A4 = 1.29126e−04 | A6 = 2.06861e−06 | A8 = −4.10995e−08 |

| Various Data |
|---|

| Zoom Ratio | 2.02 |
|---|---|

| | Wide Angle | Intermediate | Telephoto |
|---|---|---|---|
| Focal Length | 14.40 | 20.26 | 29.10 |
| F Number | 4.10 | 5.11 | 6.40 |
| Half Angle of View | 43.43 | 34.00 | 25.11 |
| Image Height | 11.42 | 12.56 | 13.22 |
| Total Optical Length | 79.00 | 79.00 | 79.00 |
| BF | 16.22 | 16.22 | 16.22 |
| d4 | 20.42 | 12.64 | 4.87 |
| d13 | 1.45 | 1.83 | 4.99 |
| d17 | 1.75 | 9.14 | 13.76 |

| Zoom Lens Unit Data | | |
|---|---|---|
| Unit | Starting Surface | Focal Length |
| 1 | 1 | −19.77 |
| 2 | 5 | 19.32 |
| 3 | 14 | −35.38 |
| 4 | 18 | 74.15 |

SEVENTH NUMERICAL EXAMPLE

| Unit: mm Surface Data | | | | |
|---|---|---|---|---|
| Surface No. | r | d | nd | vd |
| 1 | 42.299 | 1.50 | 1.75500 | 52.3 |
| 2 | 18.914 | 8.16 | | |
| 3 | −142.144 | 1.20 | 1.59282 | 68.6 |
| 4 | 30.217 | 5.54 | | |
| 5 | 33.034 | 2.03 | 1.96300 | 24.1 |
| 6 | 50.217 (Variable) | | | |
| 7 | 3588.151 | 3.04 | 1.53775 | 74.7 |
| 8 | −40.853 | 1.62 | | |
| 9 | 23.007 | 4.07 | 1.79952 | 42.2 |
| 10 | −26.519 | 1.01 | 1.95375 | 32.3 |
| 11 | 79.436 | 3.46 | | |
| 12 (Diaphragm) | ∞ | 5.69 | | |
| 13 | 28.102 | 1.00 | 1.85150 | 40.8 |
| 14 | 11.348 | 4.25 | 1.59522 | 67.7 |
| 15 | −45.381 (Variable) | | | |
| 16 | 41.052 | 0.80 | 1.51742 | 52.4 |
| 17 | 15.294 | 6.27 | | |
| 18* | −51.838 | 2.10 | 1.53110 | 55.9 |
| 19* | −1006.304 (Variable) | | | |
| 20 | −200.000 | 5.59 | 1.77250 | 49.6 |
| 21 | −45.565 | 19.41 | | |
| Image Plane | ∞ | | | |

-continued

| Unit: mm<br>Surface Data | | | |
|---|---|---|---|
| Aspheric Surface Data | | | |
| Surface No. 18 | | | |

K = 0.00000e+00     A4 = −2.18376e−04   A6 = 8.06571e−07     A8 = −7.88304e−09

Surface No. 19

K = 0.00000e+00     A4 = −1.88281e−04   A6 = 7.88400e−07     A8 = −4.74781e−09

Various Data

Zoom Ratio     2.35

|  | Wide Angle | Intermediate | Telephoto |
|---|---|---|---|
| Focal Length | 20.60 | 31.11 | 48.50 |
| F Number | 4.10 | 5.20 | 5.88 |
| Half Angle of View | 46.39 | 34.93 | 24.22 |
| Image Height | 18.22 | 20.32 | 21.63 |
| Total Optical Length | 106.52 | 106.52 | 106.52 |
| BF | 19.41 | 19.41 | 19.41 |
| d6 | 26.05 | 13.88 | 1.70 |
| d15 | 1.00 | 2.05 | 6.67 |
| d19 | 2.72 | 13.84 | 21.40 |

Zoom Lens Unit Data

| Unit | Starting Surface | Focal Length |
|---|---|---|
| 1 | 1 | −28.51 |
| 2 | 7 | 23.49 |
| 3 | 16 | −31.34 |
| 4 | 20 | 75.20 |

EIGHTH NUMERICAL EXAMPLE

Unit: mm
Surface Data

| Surface No. | r | d | nd | vd |
|---|---|---|---|---|
| 1 | 53.207 | 1.50 | 1.56873 | 63.1 |
| 2 | 16.622 | 7.57 | | |
| 3 | −68.318 | 1.05 | 1.59282 | 68.6 |
| 4 | 20.188 | 1.88 | | |
| 5 | 22.177 | 4.81 | 1.67300 | 38.1 |
| 6 | 303.175 (Variable) | | | |
| 7 | −390.013 | 3.82 | 1.83481 | 42.7 |
| 8 | −22.157 | 1.13 | 1.85478 | 24.8 |
| 9 | −43.655 | 2.83 | | |
| 10 (Diaphragm) | ∞ | 2.00 | | |
| 11 | 17.738 | 5.00 | 1.62012 | 49.5 |
| 12 | −24.982 | 1.04 | 1.72916 | 54.7 |
| 13 | −126.820 | 0.62 | | |
| 14 | −36.879 | 1.30 | 1.63636 | 35.4 |
| 15 | 22.093 | 2.12 | | |
| 16* | 20.258 | 8.00 | 1.49700 | 81.5 |
| 17 | −23.259 (Variable) | | | |
| 18 | 23.181 | 0.80 | 1.83400 | 37.2 |
| 19 | 16.379 | 8.72 | | |
| 20* | −38.270 | 2.00 | 1.53110 | 55.9 |
| 21* | −1000.082 (Variable) | | | |
| 22 | −94.189 | 3.24 | 1.90043 | 37.4 |
| 23 | −44.336 | 12.68 | | |
| Image Plane | ∞ | | | |

-continued

| Unit: mm Surface Data | | | |
|---|---|---|---|

| Asheric Surface Data | | | |
|---|---|---|---|

| Surface No. 16 | | | |
|---|---|---|---|

| K = 0.00000e+00 | A4 = 4.03365e−05 | A6 = 2.61305e−07 | A8 = 4.93537e−09 |
|---|---|---|---|

| Surface No. 17 | | | |
|---|---|---|---|

| K = 0.00000e+00 | A4 = 1.07782e−04 | A6 = 1.53281e−07 | A8 = 1.05584e−08 |
|---|---|---|---|

| Surface No. 20 | | | |
|---|---|---|---|

| K = 0.00000e+00 | A4 = −8.22161e−05 | A6 = −2.06230e−07 | A8 = −1.64392e−09 |
|---|---|---|---|

| Surface No. 21 | | | |
|---|---|---|---|

| K = 0.00000e+00 | A4 = −8.59697e−05 | A6 = −2.01790e−08 | A8 = −5.63818e−10 |
|---|---|---|---|

| Various Data | | | |
|---|---|---|---|

| Zoom Ratio | 1.89 | | |
|---|---|---|---|

| | Wide Angle | Intermediate | Telephoto |
|---|---|---|---|
| Focal Length | 20.60 | 28.46 | 39.00 |
| F Number | 4.10 | 4.10 | 4.10 |
| Half Angle of View | 46.54 | 37.19 | 29.03 |
| Image Height | 17.95 | 19.62 | 20.75 |
| Total Optical Length | 94.84 | 94.84 | 94.84 |
| BF | 12.68 | 12.68 | 12.68 |
| d6 | 18.34 | 9.92 | 1.50 |
| d17 | 1.50 | 0.59 | 1.68 |
| d21 | 2.88 | 12.21 | 19.54 |

| Zoom Lens Unit Data | | |
|---|---|---|
| Unit | Starting Surface | Focal Length |
| 1 | 1 | −31.92 |
| 2 | 7 | 22.87 |
| 3 | 18 | −34.60 |
| 4 | 22 | 90.25 |

NINTH NUMERICAL EXAMPLE

| Unit: mm Surface Data | | | | |
|---|---|---|---|---|
| Surface No. | r | d | nd | vd |
| 1 | 44.975 | 1.00 | 1.90043 | 37.4 |
| 2 | 19.088 | 8.42 | | |
| 3* | −122.965 | 1.00 | 1.49700 | 81.5 |
| 4* | 22.025 | 3.28 | | |
| 5 | 27.492 | 5.00 | 1.85025 | 30.1 |
| 6 | 75.030 (Variable) | | | |
| 7 | 389.049 | 4.00 | 1.61800 | 63.4 |
| 8 | −55.585 | 1.00 | | |
| 9 | 22.126 | 4.47 | 1.64250 | 58.4 |
| 10 | −24.638 | 1.21 | 1.80400 | 46.5 |
| 11 | 185.238 | 4.57 | | |
| 12 (Diaphragm) | ∞ | 3.80 | | |
| 13 | 32.366 | 1.50 | 1.90043 | 37.4 |
| 14 | 11.698 | 3.32 | 1.59282 | 68.6 |
| 15 | −97.476 | 0.15 | | |
| 16 | 35.347 | 1.24 | 1.90043 | 37.4 |
| 17 | 109.671 (Variable) | | | |
| 18 | 41.899 | 0.80 | 1.62588 | 35.7 |
| 19 | 13.676 (Variable) | | | |
| 20* | −195.423 | 3.00 | 1.53110 | 55.9 |
| 21* | −1002.757 (Variable) | | | |
| 22 | −71.131 | 6.00 | 1.84666 | 23.8 |
| 23 | −46.818 | 14.78 | | |
| Image Plane | ∞ | | | |

-continued

| Unit: mm Surface Data | | | |
| --- | --- | --- | --- |

Aspheric Surface Data

Surface No. 3

| K = 0.00000e+00 | A4 = −6.21287e−06 | A6 = −3.14036e−09 | A8 = 4.98296e−11 |
| --- | --- | --- | --- |

Surface No. 4

| K = 0.00000e+00 | A4 = −1.07881e−05 | A6 = −4.82882e−09 | A8 = 3.27804e−11 |
| --- | --- | --- | --- |

Surface No. 20

| K = 0.00000e+00 | A4 = −8.73827e−05 | A6 = 8.99560e−08 | A8 = 8.68479e−10 |
| --- | --- | --- | --- |

Surface No. 21

| K = 0.00000e+00 | A4 = −9.07138e−05 | A6 = 3.54526e−08 | A8 = −2.60413e−10 |
| --- | --- | --- | --- |

Various Data

| Zoom Ratio | 2.35 | | |
| --- | --- | --- | --- |

| | Wide Angle | Intermediate | Telephoto |
| --- | --- | --- | --- |
| Focal Length | 20.60 | 31.63 | 48.50 |
| F Number | 4.10 | 5.20 | 5.88 |
| Half Angle of View | 46.39 | 34.41 | 24.07 |
| Image Height | 18.15 | 19.86 | 21.22 |
| Total Optical Length | 107.00 | 107.00 | 107.00 |
| BF | 14.78 | 14.78 | 14.78 |
| d6 | 27.59 | 15.18 | 2.76 |
| d17 | 1.87 | 1.00 | 2.80 |
| d19 | 8.00 | 8.87 | 7.06 |
| d21 | 1.00 | 13.41 | 25.83 |

Zoom Lens Unit Data

| Unit | Starting Surface | Focal Length |
| --- | --- | --- |
| 1 | 1 | −31.38 |
| 2 | 7 | 22.26 |
| 3 | 18 | −32.80 |
| 4 | 20 | −457.62 |
| 5 | 22 | 145.34 |

Various numerical values in each embodiment are provided in the following table.

TABLE 1

| | First embodiment | Second embodiment | Third embodiment | Fourth embodiment | Fifth embodiment |
| --- | --- | --- | --- | --- | --- |
| fw | 14.40 | 12.40 | 12.40 | 14.41 | 14.40 |
| ft | 29.10 | 29.10 | 29.10 | 29.10 | 29.10 |
| R1 | −459.62 | −301.07 | −260.84 | −168.03 | 123.77 |
| R2 | −33.94 | −30.04 | −33.21 | −40.75 | −42.89 |
| f1 | −18.40 | −18.26 | −19.53 | −18.09 | −18.99 |
| f2 | 18.55 | 17.57 | 17.94 | 21.77 | 17.83 |
| f3 | −28.78 | −27.60 | −29.69 | −76.37 | −24.27 |
| f2a | 75.05 | 68.14 | 77.80 | 109.73 | 65.73 |
| f2b | 22.19 | 20.95 | 20.99 | 24.78 | 22.39 |
| βt2a | 1.79 | 1.86 | 1.70 | 1.46 | 2.01 |
| βtr | −0.88 | −0.86 | −0.87 | −1.10 | −0.76 |
| X2asp | 12.70 | 8.50 | 4.46 | 4.24 | 11.39 |
| X2a3 | 30.99 | 29.76 | 28.55 | 31.06 | 27.15 |
| TL1 | 11.18 | 12.91 | 13.77 | 12.98 | 12.09 |
| TTL | 78.52 | 83.44 | 82.02 | 87.56 | 77.16 |
| BFw | 11.50 | 12.13 | 12.79 | 25.00 | 11.54 |
| (R1 + R2)/ (R1 − R2) | 1.159 | 1.222 | 1.292 | 1.640 | 0.485 |
| (−f1)/f2 | 0.992 | 1.039 | 1.089 | 0.831 | 1.065 |
| f2a/f2 | 4.046 | 3.878 | 4.336 | 5.040 | 3.686 |
| f2a/ft | 2.579 | 2.342 | 2.673 | 3.771 | 2.259 |
| f2a/f2b | 3.381 | 3.253 | 3.707 | 4.429 | 2.936 |
| (1 − βt2a)βtr | 0.700 | 0.736 | 0.616 | 0.508 | 0.770 |
| X2asp/TTL | 0.162 | 0.102 | 0.054 | 0.048 | 0.148 |

TABLE 1-continued

| | | | | | |
|---|---|---|---|---|---|
| X2a3/TTL | 0.395 | 0.357 | 0.348 | 0.355 | 0.352 |
| X2asp/ (X2asp + X2a3) | 0.291 | 0.222 | 0.135 | 0.120 | 0.295 |
| $(-f1)/fw$ | 1.278 | 1.473 | 1.575 | 1.255 | 1.319 |
| $(-f3)/fw$ | 1.999 | 2.226 | 2.394 | 5.300 | 1.685 |
| TL1/TTL | 0.142 | 0.155 | 0.168 | 0.148 | 0.157 |
| BFw/f2 | 0.620 | 0.690 | 0.713 | 1.148 | 0.647 |

| | Sixth embodiment | Seventh embodiment | Eighth embodiment | Ninth embodiment |
|---|---|---|---|---|
| fw | 14.40 | 20.60 | 20.60 | 20.60 |
| ft | 29.10 | 48.50 | 39.00 | 48.50 |
| R1 | 127.70 | 3588.15 | −390.01 | 389.05 |
| R2 | −66.26 | −40.85 | −43.66 | −55.59 |
| f1 | −19.77 | −28.51 | −31.92 | −31.38 |
| f2 | 19.32 | 23.49 | 22.87 | 22.26 |
| f3 | −35.38 | −31.34 | −34.60 | −32.80 |
| f2a | 67.18 | 75.14 | 60.03 | 78.97 |
| f2b | 22.51 | 30.12 | 29.53 | 27.14 |
| $\beta t2a$ | 1.91 | 2.52 | 5.51 | 2.83 |
| $\beta tr$ | −0.77 | −0.68 | −0.22 | −0.55 |
| X2asp | 12.16 | 13.20 | 7.79 | 15.25 |
| X2a3 | 30.91 | 34.32 | 40.89 | 38.92 |
| TL1 | 7.70 | 18.43 | 16.81 | 18.70 |
| TTL | 79.00 | 106.52 | 94.84 | 107.00 |
| BFw | 16.22 | 19.41 | 12.68 | 14.78 |
| (R1 + R2)/ (R1 − R2) | 0.317 | 0.977 | 1.252 | 0.750 |
| $(-f1)/f2$ | 1.023 | 1.214 | 1.396 | 1.410 |
| f2a/f2 | 3.477 | 3.199 | 2.625 | 3.548 |
| f2a/ft | 2.309 | 1.549 | 1.539 | 1.628 |
| f2a/f2b | 2.985 | 2.495 | 2.033 | 2.910 |
| (1 − $\beta t2a)\beta tr$ | 0.700 | 1.026 | 1.000 | 1.000 |
| X2asp/TTL | 0.154 | 0.124 | 0.082 | 0.143 |
| X2a3/TTL | 0.391 | 0.322 | 0.431 | 0.364 |
| X2asp/ (X2asp + X2a3) | 0.282 | 0.278 | 0.160 | 0.282 |
| $(-f1)/fw$ | 1.373 | 1.384 | 1.550 | 1.523 |
| $(-f3)/fw$ | 2.457 | 1.521 | 1.680 | 1.592 |
| TL1/TTL | 0.097 | 0.173 | 0.177 | 0.175 |
| BFw/f2 | 0.840 | 0.826 | 0.554 | 0.664 |

Imaging Apparatus

Figure 19:
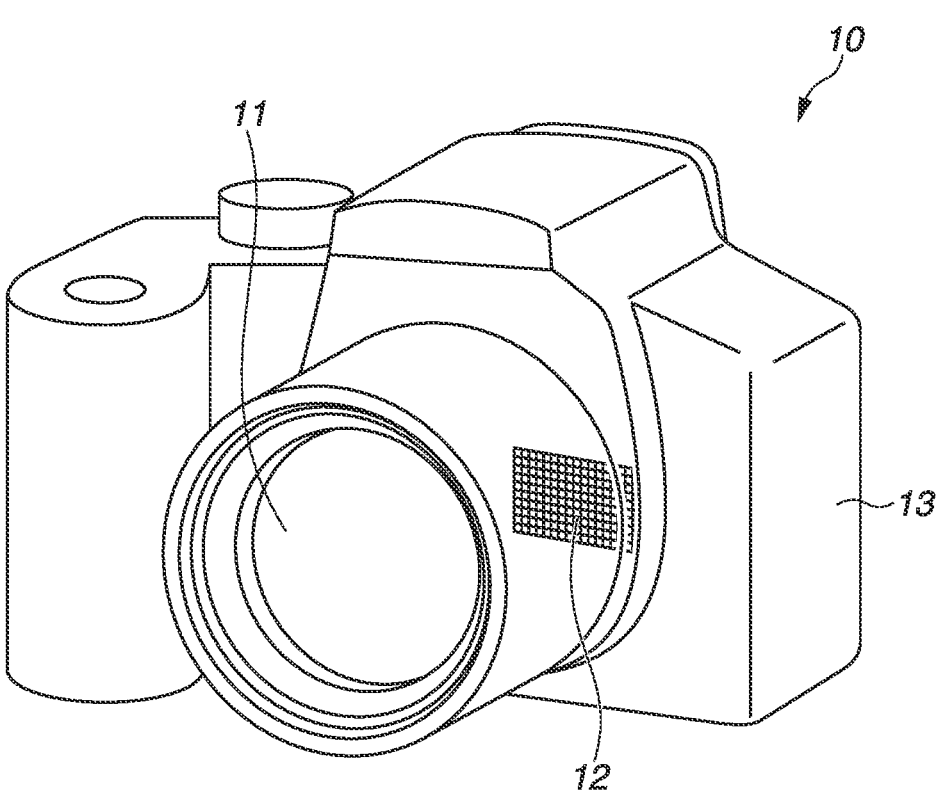
FIG. 19 schematically illustrates a main part of an imaging apparatus of the aspect of the embodiments.

An embodiment of a digital still camera (imaging apparatus) 10 using the zoom lens according to the disclosure as an imaging optical system will be described below with reference to FIG. 19. FIG. 19 illustrates an imaging optical system 11 including one of the zoom lenses according to the first to ninth embodiments. A camera body 13 includes an image sensor (photoelectric conversion element) 12 such as a CCD or CMOS sensor that receives an optical image formed by the imaging optical system 11 and photoelectrically converts the image into an electrical signal. The camera body 13 can be a single lens reflex camera with a quick turn mirror or a mirror-less camera without a quick turn mirror.

As described above, by applying the zoom lens according to the aspect of the embodiments to an imaging apparatus such as a digital still camera, it is possible to obtain images with a high resolution and a wide viewing angle.

While the disclosure has been described based on various embodiments and examples above, the disclosure is not limited to the embodiments and examples, and the embodiments and examples can be combined, modified and changed in diverse ways within the scope of the appended claims.

While the disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of Japanese Patent Application No. 2022-187859, filed Nov. 25, 2022, which is hereby incorporated by reference herein in its entirety.

What is claimed is:

1. A zoom lens comprising a first lens unit having a negative refractive power, a second lens unit having a positive refractive power, and a rear lens group including one or more lens units, which are disposed in this order from an object side to an image side, a distance between adjacent lens units changing in zooming, wherein the first lens unit is configured to not move and the second lens unit is configured to move in zooming, wherein the second lens unit includes subunits L2*a* and L2*b* having a positive refractive power, which are disposed in this order from the object side, wherein the subunit L2*a* is configured to move so as to include a component in a direction perpendicular to an optical axis in image stabilization, wherein the rear lens group includes a focus lens unit configured to move in focusing, and wherein the following inequalities are satisfied:

$$0.21 < (R1+R2)/(R1-R2) < 5.00;$$

$$0.1 < |f1|/f2 < 3.0$$

where R1 denotes a curvature radius of a lens surface disposed closest to the object side in the subunit L2a, R2 denotes a curvature radius of a lens surface disposed closest to the image side in the subunit L2a, f1 denotes a focal length of the first lens unit, and f2 denotes a focal length of the second lens unit.

2. The zoom lens according to claim 1, wherein the subunit L2a includes one lens element.

3. The zoom lens according to claim 1, wherein the following inequality is satisfied:

$$2.2 < f2a/f2 < 6.0$$

where f2a denotes a focal length of the subunit L2a.

4. The zoom lens according to claim 1, wherein the following inequality is satisfied:

$$1.2 < f2a/ft < 4.5$$

where f2a denotes a focal length of the subunit L2a, and ft denotes a focal length of an entire system at a telephoto end.

5. The zoom lens according to claim 1, wherein the following inequality is satisfied:

$$1.6 < f2a/f2b < 5.0$$

where f2a denotes a focal length of the subunit L2a, and f2b denotes a focal length of the subunit L2b.

6. The zoom lens according to claim 1, wherein the following inequality is satisfied:

$$0.4 < (1-\beta t2a)^* \beta tr < 1.5$$

where βt2a denotes a lateral magnification of the subunit L2a at a telephoto end, and βtr denotes a combined lateral magnification of all lenses disposed on the image side of the subunit L2a at the telephoto end.

7. The zoom lens according to claim 1, wherein the focus lens unit is a lens unit disposed closest to the object side in the rear lens group.

8. The zoom lens according to claim 1, wherein the subunit L2b includes an aperture diaphragm, and wherein the following inequality is satisfied:

$$0.035 < X2asp/TTL < 0.2$$

where X2asp denotes a distance on the optical axis from the lens surface disposed closest to the object side in the subunit L2a to the aperture diaphragm, and TTL denotes a total optical length of the zoom lens.

9. The zoom lens according to claim 1, wherein the following inequality is satisfied:

$$0.25 < X2a3/TTL < 0.46$$

where X2a3 denotes a distance on the optical axis from the lens surface disposed closest to the object side in the subunit L2a to a lens surface disposed closest to the image side in the focus lens unit at a wide-angle end, and TTL denotes a total optical length of the zoom lens.

10. The zoom lens according to claim 1, wherein the subunit L2b includes an aperture diaphragm, and wherein the following inequality is satisfied:

$$0.09 < X2asp/(X2asp+X2a3) < 0.4$$

where X2asp denotes a distance on the optical axis from the lens surface disposed closest to the object side in the subunit L2a to the aperture diaphragm, and X2a3 denotes a distance on the optical axis from the lens surface disposed closest to the object side in the subunit L2a to a lens surface disposed closest to the image side in the focus lens unit at a wide-angle end.

11. The zoom lens according to claim 1, wherein the second lens unit and the focus lens unit are configured to move to the object side in zooming from a wide-angle end to a telephoto end.

12. The zoom lens according to claim 1, wherein the focus lens unit has a negative refractive power, and is configured to move to the image side in focusing from infinity to a close distance.

13. The zoom lens according to claim 1, wherein the following inequality is satisfied:

$$0.1 < |f1|/fw < 3.5$$

where fw denotes a focal length of an entire system at a wide-angle end.

14. The zoom lens according to claim 1, wherein a third lens unit as the focus lens unit is disposed closest to the object side in the rear lens group, and wherein the following inequality is satisfied:

$$1.2 < |f3|/fw < 5.6$$

where f3 denotes a focal length of the third lens unit, and fw denotes a focal length of an entire system at a wide-angle end.

15. The zoom lens according to claim 1, wherein the first lens unit includes two or more lenses.

16. The zoom lens according to claim 15, wherein the first lens unit includes a positive lens and a negative lens.

17. The zoom lens according to claim 1, wherein the following inequality is satisfied:

$$0.05 < TL1/TTL < 0.2$$

where TL1 denotes a total lens length of the first lens unit, and TTL denotes a total optical length of the zoom lens.

18. The zoom lens according to claim 1, wherein the following inequality is satisfied:

$$0.4 < BFw/f2 < 1.2$$

where BFw denotes a back focus of the zoom lens at a wide-angle end.

19. The zoom lens according to claim 1, wherein a last lens unit having a positive refractive power is disposed closest to the image side in the rear lens group, and the last lens unit is configured to not move in zooming.

20. The zoom lens according to claim 1, wherein a last lens unit having a positive refractive power is disposed closest to the image side in the rear lens group, and the last lens unit includes one lens element.

21. The zoom lens according to claim 1, wherein a lens element having a meniscus shape with a convex surface facing toward the image side is disposed closest to the image side in the rear lens group, and the lens element has a positive refractive power.

22. The zoom lens according to claim 1, wherein the rear lens group includes a third lens unit having a negative refractive power, and a fourth lens unit having a positive refractive power.

23. The zoom lens according to claim 1, wherein the rear lens group includes a third lens unit having a negative refractive power, a fourth lens unit having a positive refractive power, and a fifth lens unit having a positive refractive power.

24. The zoom lens according to claim 1, wherein the rear lens group includes a third lens unit having a negative refractive power, a fourth lens unit having a negative refractive power, and a fifth lens unit having a positive refractive power.

25. The zoom lens according to claim 1, wherein the rear lens group includes a third lens unit having a negative refractive power.

26. An apparatus comprising a zoom lens and a sensor that converts an image formed by the zoom lens, wherein the zoom lens includes a first lens unit having a negative refractive power, a second lens unit having a positive refractive power, and rear lens group including one or more lens units, which are disposed in this order from an object side to an image side, a distance between adjacent lens units changing in zooming, wherein the first lens unit is configured to not move and the second lens unit is configured to move in zooming, wherein the second lens unit includes subunits L2$a$ and L2$b$ having a positive refractive power, which are disposed in this order from the object side, wherein the subunit L2$a$ is configured to move so as to include a component in a direction perpendicular to an optical axis in image stabilization, wherein the rear lens group includes a focus lens unit configured to move in focusing, and wherein the following inequalities are satisfied:

$$0.21 < (R1+R2)/(R1-R2) < 5.00;$$

$$0.1 < |f1|/f2 < 3.0$$

where R1 denotes a curvature radius of a lens surface disposed closest to the object side in the subunit L2$a$, R2 denotes a curvature radius of a lens surface disposed closest to the image side in the subunit L2$a$, f1 denotes a focal length of the first lens unit, and f2 denotes a focal length of the second lens unit.

* * * * *